(12) United States Patent
Sasanuma et al.

(10) Patent No.: US 9,001,090 B2
(45) Date of Patent: Apr. 7, 2015

(54) DISPLAY DEVICE

(75) Inventors: Keita Sasanuma, Mobara (JP); Yoshinori Aoki, Mobara (JP)

(73) Assignees: Japan Display Inc., Tokyo (JP); Panasonic Liquid Crystal Display Co., Ltd., Himeji-Shi, Hyogo (JP)

( * ) Notice: Subject to any disclaimer, the term of this patent is extended or adjusted under 35 U.S.C. 154(b) by 644 days.

(21) Appl. No.: 13/280,374

(22) Filed: Oct. 25, 2011

(65) Prior Publication Data
US 2012/0105425 A1 May 3, 2012

(30) Foreign Application Priority Data
Oct. 29, 2010 (JP) ................................. 2010-244423

(51) Int. Cl.
G06F 3/038 (2013.01)
G09G 5/00 (2006.01)
G09G 3/36 (2006.01)
G02F 1/1343 (2006.01)

(52) U.S. Cl.
CPC ........ *G09G 3/3655* (2013.01); *G02F 1/134336* (2013.01); *G02F 1/134363* (2013.01); *G09G 3/3614* (2013.01); *G09G 2300/0408* (2013.01); *G09G 2300/0866* (2013.01); *G09G 2300/0876* (2013.01); *G09G 2310/0283* (2013.01); *G09G 2320/0285* (2013.01)

(58) Field of Classification Search
None
See application file for complete search history.

(56) References Cited

U.S. PATENT DOCUMENTS

| | | | | |
|---|---|---|---|---|
| 6,476,785 | B1* | 11/2002 | Pathak et al. .................. | 345/90 |
| 8,390,552 | B2* | 3/2013 | Miyashita ....................... | 345/90 |
| 8,421,716 | B2* | 4/2013 | Numao ............................ | 345/76 |
| 8,456,583 | B2* | 6/2013 | Shimoshikiryoh et al. ..... | 349/39 |
| 2002/0008685 | A1* | 1/2002 | Ban et al. ........................ | 345/92 |
| 2002/0180717 | A1* | 12/2002 | Ishiyama ....................... | 345/204 |
| 2005/0036078 | A1* | 2/2005 | Tsunashima et al. .......... | 349/38 |
| 2005/0270266 | A1* | 12/2005 | Lin et al. ....................... | 345/103 |

(Continued)

FOREIGN PATENT DOCUMENTS

| | | |
|---|---|---|
| JP | 06-161390 | 6/1994 |
| JP | 10-313418 | 11/1998 |

(Continued)

OTHER PUBLICATIONS

Partial Translation of the relevant portions of Office Action in corresponding Taiwanese Application No. 100138520 dated Mar. 12, 2014.

(Continued)

*Primary Examiner* — Antonio Xavier
(74) *Attorney, Agent, or Firm* — Lowe Hauptman & Ham, LLP

(57) ABSTRACT

Provided is a display device capable of improving the display quality by suppressing the influence of a difference in hold voltage in a pixel circuit occurring between forward scanning driving and backward scanning driving. The display device includes: a data signal line; a plurality of pixel circuits; a plurality of gate signal lines; a gate signal line driving circuit for performing any one of forward scanning driving and backward scanning driving and performs gate overlapping driving; a data signal line driving circuit; and a reference voltage line driving circuit for supplying a reference voltage. The reference voltage line driving circuit selects and supplies a reference voltage for forward direction and a reference voltage for reverse direction, during the forward scanning driving and the backward scanning driving, respectively.

15 Claims, 9 Drawing Sheets

(56) References Cited

U.S. PATENT DOCUMENTS

| | | | |
|---|---|---|---|
| 2006/0012555 A1* | 1/2006 | Tokumura | 345/98 |
| 2007/0018936 A1* | 1/2007 | Chia | 345/98 |
| 2008/0074376 A1* | 3/2008 | Kim et al. | 345/94 |
| 2008/0084370 A1* | 4/2008 | Wang et al. | 345/87 |
| 2008/0122814 A1* | 5/2008 | Shin et al. | 345/204 |
| 2008/0170024 A1 | 7/2008 | Song et al. | |
| 2008/0278471 A1* | 11/2008 | Huang | 345/211 |
| 2008/0303769 A1* | 12/2008 | Tobita | 345/92 |
| 2009/0021466 A1* | 1/2009 | Otose et al. | 345/100 |
| 2009/0066622 A1* | 3/2009 | Yang et al. | 345/89 |
| 2009/0086116 A1* | 4/2009 | Pak | 349/38 |
| 2009/0262058 A1* | 10/2009 | Pak et al. | 345/92 |
| 2010/0097366 A1* | 4/2010 | Kitayama et al. | 345/213 |
| 2010/0156960 A1* | 6/2010 | Yi | 345/690 |

FOREIGN PATENT DOCUMENTS

| | | |
|---|---|---|
| JP | 2000-147459 | 5/2000 |
| JP | 2001-356738 | 12/2001 |
| JP | 2002-169522 | 6/2002 |
| JP | 2002-202761 | 7/2002 |
| JP | 2008-083399 | 4/2008 |
| KR | 10-2008-0091963 | 10/2005 |
| TW | 200402673 | 2/2004 |
| TW | 200501041 | 1/2005 |
| WO | WO 2010/150562 | 12/2010 |

OTHER PUBLICATIONS

English translation of Office Action in corresponding foreign Japanese Application No. 2010-244423, dated Apr. 22, 2014.

* cited by examiner

DISPLAY DEVICE

CROSS-REFERENCE TO RELATED APPLICATION

The present application claims priority from Japanese application JP 2010-244423 filed on Oct. 29, 2010, the content of which is hereby incorporated by reference into this application.

BACKGROUND OF THE INVENTION

1. Field of the Invention

The present invention relates to a display device. In particular, the present invention relates to improvement of the display quality of a display device capable of bidirectional scanning driving.

2. Description of the Related Art

In a display device, a gate signal line driving circuit, a data signal line driving circuit, and the like control a plurality of pixel circuits provided in a display portion. Generally, the pixel circuits are each provided with a switching element, and, for example, in the case of a liquid crystal display device, the pixel circuits are each provided with a pixel electrode. The switching element is provided between a data signal line extending from the data signal line driving circuit and, for example, the pixel electrode. A switch of the switching element is connected to a gate signal line extending from the gate signal line driving circuit, and the switching element is controlled by a voltage applied to the gate signal line.

The gate signal line driving circuit sequentially outputs, to the plurality of gate signal lines arranged in order, gate signals indicating an ON voltage for a gate signal ON period and an OFF voltage for a gate signal OFF period. When a gate signal output to a gate signal line becomes the ON voltage, a switching element connected to the gate signal line enters the ON state. The data signal line driving circuit supplies a display control voltage corresponding to display data of a pixel circuit including the ON-state switching element, to the data signal line. The display control voltage applied to the data signal line is then applied to the pixel electrode of the pixel circuit via the ON-state switching element. A capacitance is formed between the pixel electrode and a reference voltage. Display of the pixel circuit is controlled by a hold voltage held between the pixel electrode and the reference voltage. Here, a data write period in which the data signal line driving circuit performs write driving of display data into one pixel circuit, namely a period in which a display control voltage corresponding to display data of one pixel circuit is supplied to the data signal line, is referred to as one horizontal period (H).

The demand for higher definition in recent years accompanies difficulty in securing sufficient time for one horizontal period (H). In order to address the problem, gate overlapping driving has been employed to lengthen the gate signal ON period of the gate signal to be longer than one horizontal period (H). In other words, the gate signal ON period of the gate signal contains one corresponding horizontal period (H) and a predetermined period prior thereto.

Further, in order to attain various kinds of image display, a gate signal line driving circuit capable of bidirectional scanning driving has been sought after, which enables both forward scanning driving in which gate signals output to a plurality of gate signal lines arranged in order are controlled to an ON voltage in a direction of the arrangement order and backward scanning driving in which the gate signals are controlled to the ON voltage in a direction reverse to the arrangement order.

SUMMARY OF THE INVENTION

FIG. 9 is a circuit diagram of pixel circuits in a commonly-used display device. FIG. 9 illustrates the n-th pixel circuit and the (n+1)th pixel circuit of a plurality of pixel circuits arranged in order from top to bottom. The n-th pixel circuit includes a pixel electrode $110_n$, a switching element, and a reference electrode (not shown). Here, the switching element is a thin film transistor (hereinafter, referred to as TFT), for example. FIG. 9 illustrates the switching element as a TFT $109_n$.

As described above, the TFT $109_n$ is provided between a data signal line 107 connected thereto and the pixel electrode $110_n$, and the gate of the TFT $109_n$ is connected to the n-th gate signal line $105_n$ of a plurality of gate signal lines 105 arranged in order. The reference electrode is connected to a reference voltage line 108. The pixel electrode $110_n$ and the reference electrode form a pixel capacitance $C_{st}$.

The pixel electrode $110_n$ of the n-th pixel circuit is disposed adjacent to the (n−1)th gate signal line $105_{n-1}$ and the n-th gate signal line $105_n$ on the upper and lower sides of FIG. 9, respectively. A parasitic capacitance $C_{gp1}$ is generated between the pixel electrode $110_n$ and the n-th gate signal line $105_n$. A parasitic capacitance $C_{gp2}$ is generated between the pixel electrode $110_n$ and the (n−1)th gate signal line $105_{n-1}$.

The gate signal line driving circuit performs gate overlapping driving to the plurality of gate signal lines, and selects and performs one of forward scanning driving and backward scanning driving. Here, a forward direction 31 is the direction of the arrangement order in which the gate signal lines 105 are arranged in order, and a backward direction 32 is the direction reverse to the arrangement order in which the gate signal lines 105 are arranged in order.

When the gate signals that are output to the gate signal lines 105 adjacent on both sides of the pixel electrode 110 change from the ON voltage to the OFF voltage, the hold voltage held in the pixel capacitance $C_{st}$ fluctuates due to coupling with the parasitic capacitances generated between the pixel electrode 110 and the gate signal lines. In other words, when the same reference voltage is supplied to the reference voltage line 108, the voltage of the pixel electrode 110 with respect to the reference electrode fluctuates. Here, the voltage to be changed because of the parasitic capacitance $C_{gp1}$ is referred to as voltage $V_1$, and the voltage to be changed because of the parasitic capacitance $C_{gp2}$ is referred to as voltage $V_2$.

In the forward scanning driving in the forward direction 31, at the end of a gate signal ON period of the n-th gate signal, the voltage of the pixel electrode $110_n$ of the n-th pixel circuit has converged to a display control voltage corresponding to display data. Then, at the timing of shift from the gate signal ON period to a gate signal OFF period, the n-th gate signal changes from the ON voltage to the OFF voltage. At the start of the gate signal OFF period, the voltage of the pixel electrode $110_n$ changes because of the parasitic capacitance $C_{gp1}$ by the voltage $V_1$ from a desired display control voltage. After the change, the voltage of the pixel electrode $110_n$ is maintained. Note that, during the gate signal ON period of the n-th gate signal, the (n−1)th gate signal changes from the ON voltage to the OFF voltage, and the voltage of the pixel electrode $110_n$ changes by the voltage $V_2$ because of the parasitic capacitance $C_{gp2}$. However, after the change, the voltage of the pixel electrode $110_n$ changes to a display control voltage, and the influence of the voltage $V_2$ is therefore suppressed.

On the other hand, in the backward scanning driving in the backward direction 32, at the end of a gate signal ON period of the n-th gate signal, the voltage of the pixel electrode $110_n$ of the n-th pixel circuit has converged to a display control voltage corresponding to display data. After that, the n-th gate signal changes from the ON voltage to the OFF voltage, and the voltage of the pixel electrode $110_n$ changes by the voltage $V_1$ from a desired display control voltage similarly to the forward scanning driving. After the change, the (n−1)th gate signal changes from the ON voltage to the OFF voltage, and the voltage of the pixel electrode $110_n$ further changes by the voltage $V_2$ because of the parasitic capacitance $C_{gp2}$. In other words, the voltage of the pixel electrode $110_n$ to be maintained after the change has a voltage difference of the sum of the voltage $V_1$ and the voltage $V_2$ from the desired display control voltage.

As described above, when the same reference voltage is supplied to the reference voltage line 108, the difference occurs in the voltage of the pixel electrode 110 with respect to the reference electrode between the forward scanning driving and the backward scanning driving. Such difference causes deterioration in display quality.

The present invention has been made in view of the above-mentioned problem, and has an object to provide a display device capable of improving the display quality by suppressing the influence of a difference in hold voltage in a pixel circuit occurring between forward scanning driving and backward scanning driving.

(1) In order to solve the above-mentioned problem, according to the present invention, there is provided a display device including: a data signal line; a plurality of pixel circuits, which are connected to the data signal line and arranged in order; a plurality of gate signal lines arranged in the arrangement order, each of which extends between adjacent ones of the plurality of pixel circuits and is connected to pixel circuits disposed on one side; a gate signal line driving circuit for selecting any one of a forward direction and a reverse direction to the arrangement order as time passes, and outputting a plurality of gate signals that are controlled to an ON voltage sequentially in the selected direction, to the plurality of gate signal lines arranged in the arrangement order; a data signal line driving circuit for selecting one of the plurality of pixel circuits and supplying a display control voltage corresponding to display data of the selected pixel circuit to the data signal line; and a reference voltage line driving circuit for supplying a reference voltage corresponding to each of the plurality of pixel circuits to the each of the plurality of pixel circuits, in which: the gate signal output to each of the plurality of gate signal lines is controlled to the ON voltage in a period in which the data signal line driving circuit supplies, to the data signal line, a display control voltage corresponding to display data of a pixel circuit connected to the each of the plurality of gate signal lines, and in a predetermined period prior to the period; the each of the plurality of pixel circuit includes a pixel electrode, a reference electrode to which the reference voltage corresponding to the each of the plurality of pixel circuits is supplied, and a switching element which is provided between the data signal line and the pixel electrode and is controlled by the gate signal; and the reference voltage line driving circuit selects and supplies one of a reference voltage for forward direction and a reference voltage for reverse direction to the reference electrode of the each of the plurality of pixel circuits in accordance with whether the gate signal line driving circuit outputs the plurality of gate signals in the one of the forward direction and the reverse direction to the arrangement order.

(2) In the display device as described in the above-mentioned item (1), the reference voltage line driving circuit may include: a storage portion for storing voltage information for determining the reference voltage for forward direction and the reference voltage for reverse direction; and a generation circuit for generating the reference voltage corresponding to the each of the plurality of pixel circuits based on the voltage information.

(3) In the display device as described in the above-mentioned item (2): the reference voltage for forward direction and the reference voltage for reverse direction may each include a direct voltage; and the voltage information may include a value of the reference voltage for forward direction and a value of the reference voltage for reverse direction.

(4) In the display device as described in the above-mentioned item (2): the reference voltage for forward direction and the reference voltage for reverse direction may each include a direct voltage; and the voltage information may include one of a value of the reference voltage for forward direction and a value of the reference voltage for reverse direction, and a difference value between the reference voltage for forward direction and the reference voltage for reverse direction.

(5) In the display device as described in the above-mentioned item (2): the reference voltage for forward direction and the reference voltage for reverse direction may each include a direct voltage; and the voltage information may include an average value between the reference voltage for forward direction and the reference voltage for reverse direction, and a half value of a difference value between the reference voltage for forward direction and the reference voltage for reverse direction.

(6) In the display device as described in the above-mentioned item (2): the reference voltage for forward direction and the reference voltage for reverse direction may each include an alternating voltage that repeats Low voltage and High voltage alternately at a predetermined cycle, the High voltage being higher than the Low voltage by a predetermined amplitude value; and the voltage information may include a reference value of the reference voltage for forward direction, a reference value of the reference voltage for reverse direction, and the predetermined amplitude value.

(7) In the display device as described in the above-mentioned item (2): the reference voltage for forward direction and the reference voltage for reverse direction may each include an alternating voltage that repeats Low voltage and High voltage alternately at a predetermined cycle, the High voltage being higher than the Low voltage by a predetermined amplitude value; and the voltage information may include any one of a reference value of the reference voltage for forward direction and a reference value of the reference voltage for reverse direction, a difference value between the reference value of the reference voltage for forward direction and the reference value of the reference voltage for reverse direction, and the predetermined amplitude value.

(8) In the display device as described in the above-mentioned item (6) or (7), the reference values may include any one of the Low voltage and the High voltage of the alternating voltage.

(9) In the display device as described in the above-mentioned item (2): the reference voltage for forward direction and the reference voltage for reverse direction may each include an alternating voltage that repeats Low voltage and High voltage alternately at a predetermined cycle, the High voltage being higher than the Low voltage by a predetermined amplitude value; and the voltage information may include an average value between a center value of the reference voltage for forward direction and a center value of the reference voltage for reverse direction, a half value of a difference value between the center value of the reference voltage for forward direction and the center value of the reference voltage for reverse direction, and a half value of the predetermined amplitude value, the center value being an average value between the Low voltage and the High voltage of the alternating voltage.

(10) In the display device as described in the above-mentioned item (2), the voltage information may include representative value information for determining any one of the reference voltage for forward direction and the reference voltage for reverse direction, and difference information for determining another one of the reference voltage for forward direction and the reference voltage for reverse direction by using the representative value information.

(11) The display device as described in the above-mentioned item (1) may further include at least one reference voltage line connected to the reference voltage line driving circuit, and in the display device: the reference electrode of the each of the plurality of pixel circuits may be connected to one of the at least one reference voltage line; and the reference voltage line driving circuit may supply, to each of the at least one reference voltage line, a reference voltage corresponding to corresponding one of the plurality of pixel circuits.

(12) In the display device as described in the above-mentioned item (1): the display device may include an IPS liquid crystal display device; and the each of the plurality of pixel circuits may have a structure in which the reference electrode is formed further from the pixel electrode with respect to the plurality of gate signal lines.

According to the present invention, provided is a display device capable of improving the display quality by suppressing the influence of a difference in hold voltage in a pixel circuit occurring between forward scanning driving and backward scanning driving.

DETAILED DESCRIPTION OF THE INVENTION

[First Embodiment]

Figure 1:
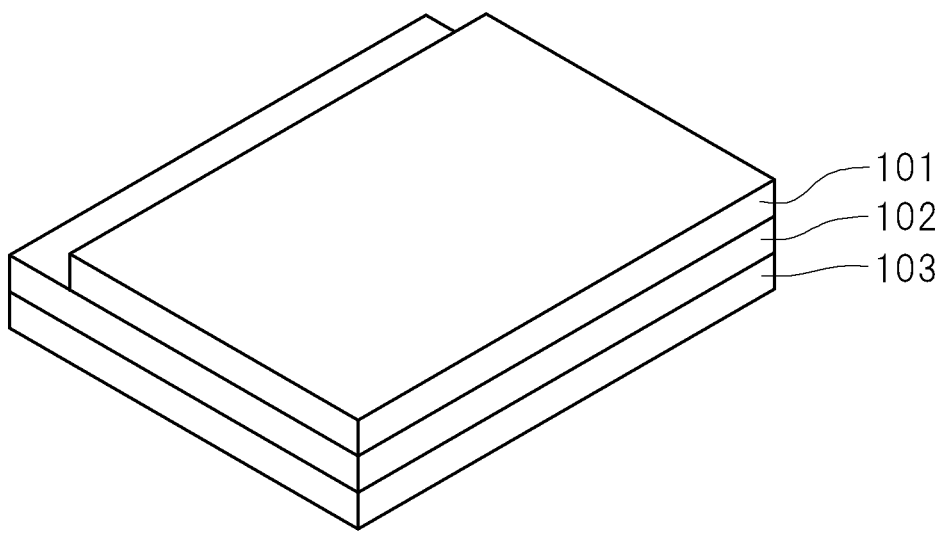
FIG. 1 is an overall perspective view of a liquid crystal display device according to embodiments of the present invention.

A display device according to a first embodiment of the present invention is, for example, an in-plane switching (IPS) liquid crystal display device. As illustrated in an overall perspective view of the liquid crystal display device of FIG. 1, the display device includes a thin film transistor (TFT) substrate 102, a filter substrate 101 which is opposed to the TFT substrate 102 and provided with a color filter, a liquid crystal material which is sealed in a region sandwiched between the two substrates, and a backlight unit 103 which is positioned in contact with the TFT substrate 102 on the side opposite to the filter substrate 101. In the TFT substrate 102, as described later, gate signal lines 105, data signal lines 107, reference voltage lines 108, pixel electrodes 110, reference electrodes 111, TFTs 109, and the like are arranged (see FIG. 3).

Figure 2:
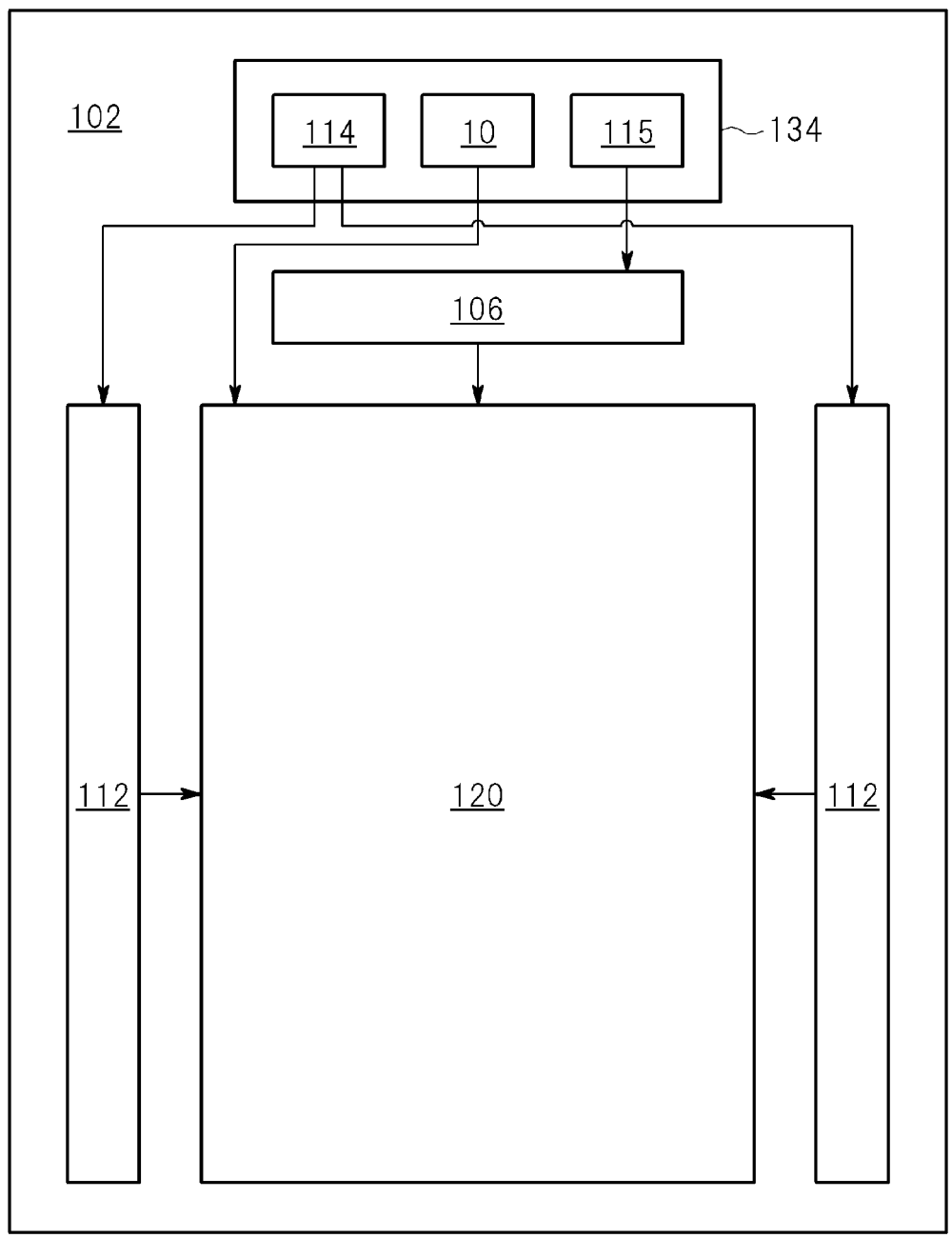
FIG. 2 is a configuration block diagram illustrating a configuration of the liquid crystal display device according to the embodiments of the present invention.

FIG. 2 is a configuration block diagram illustrating a configuration of the liquid crystal display device according to the first embodiment. The TFT substrate 102 includes a display portion 120, a driver IC 134, an RGB switch circuit 106, and shift register circuits 112. Note that, the RGB switch circuit 106 may be omitted. Further, the driver IC 134 includes a gate signal line control circuit 114, a data signal line driving circuit 115, and a reference voltage line driving circuit 10. Note that, the gate signal line control circuit 114, the data signal line driving circuit 115, and the reference voltage line driving circuit 10 are provided in the driver IC 134 in this embodiment, but those may be provided separately, or part thereof may be provided in a single driver IC.

The gate signal line control circuit 114 outputs control signals to the shift register circuits 112 disposed on both sides of the display portion 120. In response to the control signal, each of the shift register circuits 112 outputs a gate signal to each of the plurality of gate signal lines 105. Here, the gate signal line control circuit 114 and the shift register circuits 112 together form a gate signal line driving circuit. The data signal line driving circuit 115 supplies a display control voltage corresponding to display data of a pixel circuit to each of the plurality of data signal lines 107 via the RGB switch circuit 106. The reference voltage line driving circuit 10 supplies reference voltages to the pixel circuits via the plurality of reference voltage lines 108.

Figure 3:
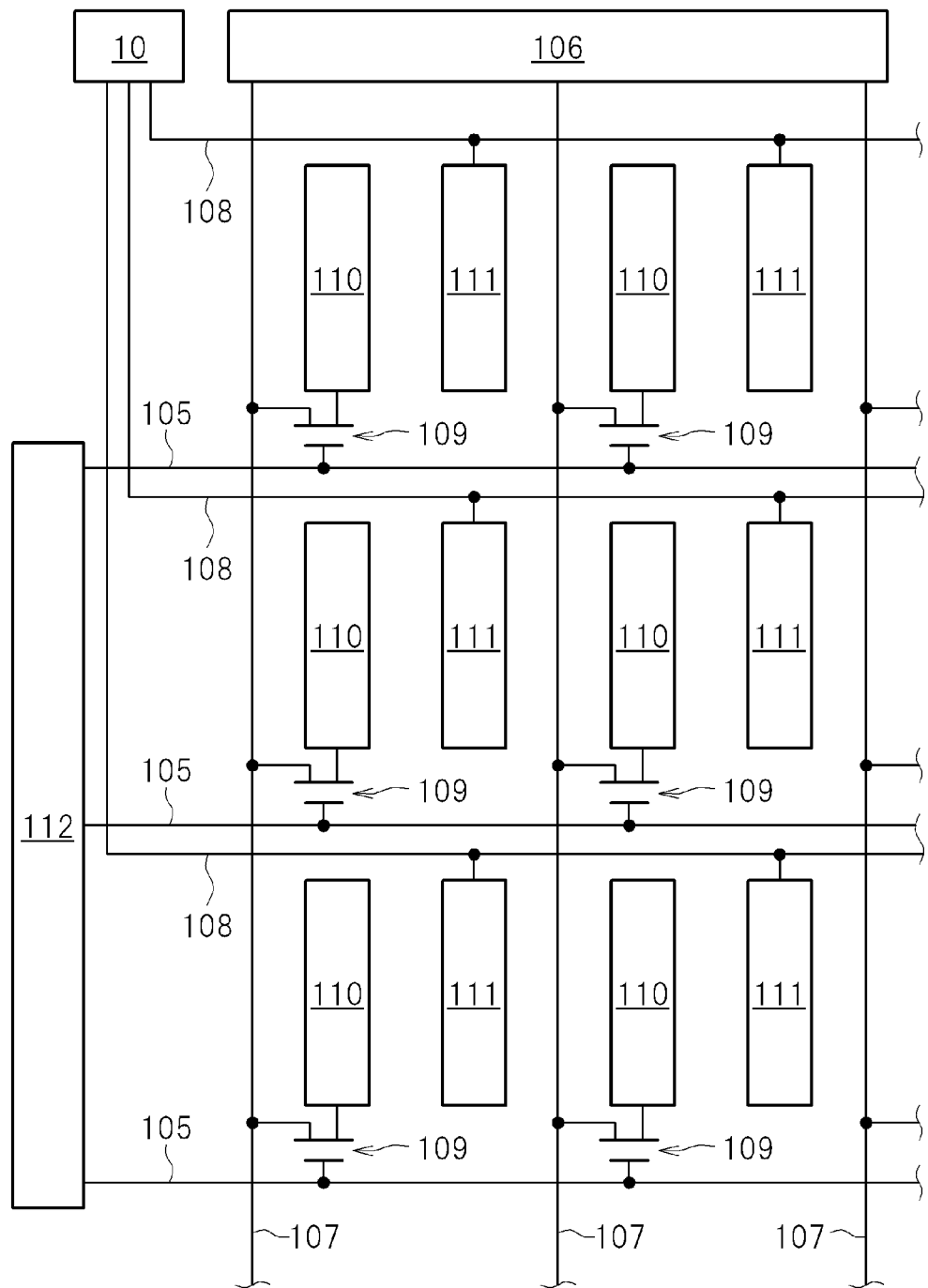
FIG. 3 is a conceptual diagram of an equivalent circuit of a TFT substrate according to the embodiments of the present invention.

FIG. 3 is a conceptual diagram of an equivalent circuit of the TFT substrate 102 according to the first embodiment. In the TFT substrate 102 illustrated in FIG. 3, the plurality of gate signal lines 105 connected to the shift register circuit 112 extend in the horizontal direction of the figure at equal intervals. The plurality of gate signal lines 105 are referred to as the 1st, 2nd, 3rd, . . . gate signal lines in order from the top of the figure. The plurality of data signal lines 107 connected to the RGB switch circuit 106 extend in the vertical direction of the figure at equal intervals. Those gate signal lines 105 and data signal lines 107 delimit pixel circuits arranged in grid. The plurality of reference voltage lines 108 connected to the reference voltage line driving circuit 10 extend in the horizontal direction of the figure in parallel to the respective gate signal lines 105. Note that, FIG. 3 illustrates the reference electrodes 111 of the pixel circuits and the plurality of reference voltage lines 108 separately, but as described later, the plurality of reference electrodes 111 may be formed as a single reference electrode film and the number of the reference voltage lines may be one.

Each of the plurality of data signal lines 107 is connected to the plurality of pixel circuits arranged in order in line. The gate signal lines 105 each extend between adjacent ones of the plurality of pixel circuits arranged in order in line, and are each connected to pixel circuits that are disposed on one side. Here, the one side is the upper side of the figure. Note that, the plurality of pixel circuits arranged in order in line are referred to as the 1st, 2nd, 3rd . . . pixel circuits in order from the top of the figure.

The pixel circuits each include the TFT 109 as a switching element, the pixel electrode 110, and the reference electrode 111. The TFT 109 is provided between the data signal line 107 connected thereto and the pixel electrode 110. The TFT 109 is controlled by a gate signal that is output to the gate signal line 105 connected to the gate of the TFT 109. In other words, the TFT 109 enters the ON state when the gate signal becomes an ON voltage.

The shift register circuits 112 include a plurality of basic circuits in correspondence with the plurality of gate signal lines 105. For example, when 800 gate signal lines 105 are present, 800 basic circuits are similarly provided in the shift register circuits 112. In response to the control signals output from the gate signal line control circuit 114, the basic circuits provided in the shift register circuits each output a gate signal indicating an ON voltage for a corresponding gate scanning period (gate signal ON period) of one frame period and an OFF voltage for the other period (gate signal OFF period), to the corresponding gate signal line 105. In this embodiment, the ON voltage is High voltage and the OFF voltage is Low voltage. The data signal line driving circuit 115 selects a pixel circuit including an ON-state TFT 109 from among the plurality of pixel circuits arranged in order in line, and supplies a display control voltage corresponding to display data of the selected pixel circuit to the data signal line 107.

In the circuit configuration described above, the reference voltage line driving circuit 10 supplies the respective reference voltages to the reference electrodes 111 of the pixel circuits via the plurality of reference voltage lines 108. The gate signal line driving circuit outputs the gate signal to each of the plurality of gate signal lines 105 arranged in order. A TFT 109 connected to the gate signal line 105 whose gate signal is the ON voltage enters the ON state, and a current flows through the ON-state TFT 109. Then, the display control voltage corresponding to display data of the pixel circuit including the ON-state TFT 109 is supplied to the data signal line 107 by the data signal line driving circuit 115, and is then applied to the pixel electrode 110 of the pixel circuit via the TFT 109 by the data signal line 107. A potential difference is thus generated between the pixel electrode 110 and the reference electrode 111 to control the orientation of liquid crystal molecules and the like, to thereby control the degree of blocking light from the backlight unit 103 and display an image.

The gate signal line driving circuit according to the first embodiment performs the above-mentioned gate overlapping driving. In other words, the gate signal ON period is longer than one horizontal period (H), and lasts for two horizontal periods (2H) in this case. The gate signal ON period contains one horizontal period (H) for writing display data into a connected pixel circuit and another horizontal period (H) prior thereto.

Further, the gate signal line driving circuit according to the first embodiment is capable of performing bidirectional scanning driving. In this case, the gate signal line driving circuit can select and perform one of forward scanning driving and backward scanning driving. In the forward scanning driving, as time passes, the gate signals to be output to the gate signal lines 105 arranged in order are controlled to the ON voltage in the direction of the arrangement order from top to bottom along the display portion 120 illustrated in FIGS. 2 and 3. Contrary, in the backward scanning driving, as time passes, the gate signals are controlled to the ON voltage in the direction reverse to the arrangement order from bottom to top along the display portion 120.

The reference voltage line driving circuit 10 according to the first embodiment performs fixed reference voltage driving, where the same reference voltage is applied to the plurality of reference voltage lines 108 extending in the display portion 120. In this case, the plurality of reference voltage lines 108 illustrated in FIG. 3 may be a single reference voltage line. In addition, as described later, the reference voltage line driving circuit 10 applies different reference voltages to the plurality of reference voltage lines 108 between the forward scanning and the backward scanning.

The data signal line driving circuit 115 according to the first embodiment performs data signal inversion driving. The data signal line driving circuit 115 sequentially supplies display control voltages having different signs to the plurality of pixel circuits, which are connected to one data signal line 107 and arranged in line, via the one data signal line 107. Here, the signs refer to the positive sign of the display control voltage when the potential of the pixel electrode 110 is higher than the potential of the reference electrode 111, and the negative sign of the display control voltage when the potential of the pixel electrode 110 is lower than the potential of the reference electrode 111.

An example of the data signal inversion driving is a dot inversion method, where the signs of the display control voltages supplied to the plurality of pixel circuits provided in the display portion 120 are distributed like a chessboard so that adjacent pixel circuits have different signs. The display control voltage supplied to the n-th pixel circuit of the plurality of pixel circuits, which are connected to one data signal line 107 and arranged in line, has a different sign from that of the display control voltage supplied to the n-th pixel circuit of the plurality of pixel circuits, which are connected to a data signal line 107 adjacent to the one data signal line 107 and arranged in line.

Another example of the data signal inversion driving is a line inversion method, where the signs of the display control voltages supplied to the plurality of pixel circuits are, for example, different for adjacent pixel circuits in the vertical direction of FIG. 3 and the same for adjacent pixel circuits in the horizontal direction. Still another example is a column inversion method, where the signs of the display control voltages supplied to the plurality of pixel circuits are, for example, different for adjacent pixel circuits in the horizontal direction of FIG. 3 and the same for adjacent pixel circuits in the vertical direction. A further example is a frame inversion method, where the signs of the display control voltages supplied to the plurality of pixel circuits are all the same. The present invention is applicable to any data signal inversion driving, including other methods than the above.

The reason why the data signal line driving circuit 115 performs the data signal inversion driving is as follows. In each pixel circuit, if the display control voltage having the same sign is supplied to the pixel electrode 110 in each frame period, the liquid crystal molecules disposed between the pixel electrode 110 and the reference electrode 111 are applied with an electric field in the same direction, and thus the liquid crystal molecules deteriorate faster. It is desired to invert the direction of the applied electric field periodically in order to suppress the deterioration in liquid crystal molecules. A conceivable driving method of inverting the direction of the applied electric field periodically is the data signal inversion driving, where the sign of the display control voltage supplied to the pixel electrode 110 is inverted.

For simple description, FIG. 3 illustrates the shift register circuit 112 only on the left side. Actually, however, as described above, the basic circuits of the shift register circuits 112 are disposed on both sides of the display portion 120, and, for example, when 800 gate signal lines 105 are present, the left ones of the plurality of basic circuits of the shift register circuits 112 disposed on both sides are configured to output the gate signals to the odd-numbered gate signal lines 105 while the right ones are configured to output the gate signals to the even-numbered gate signal lines 105.

Figure 4A:
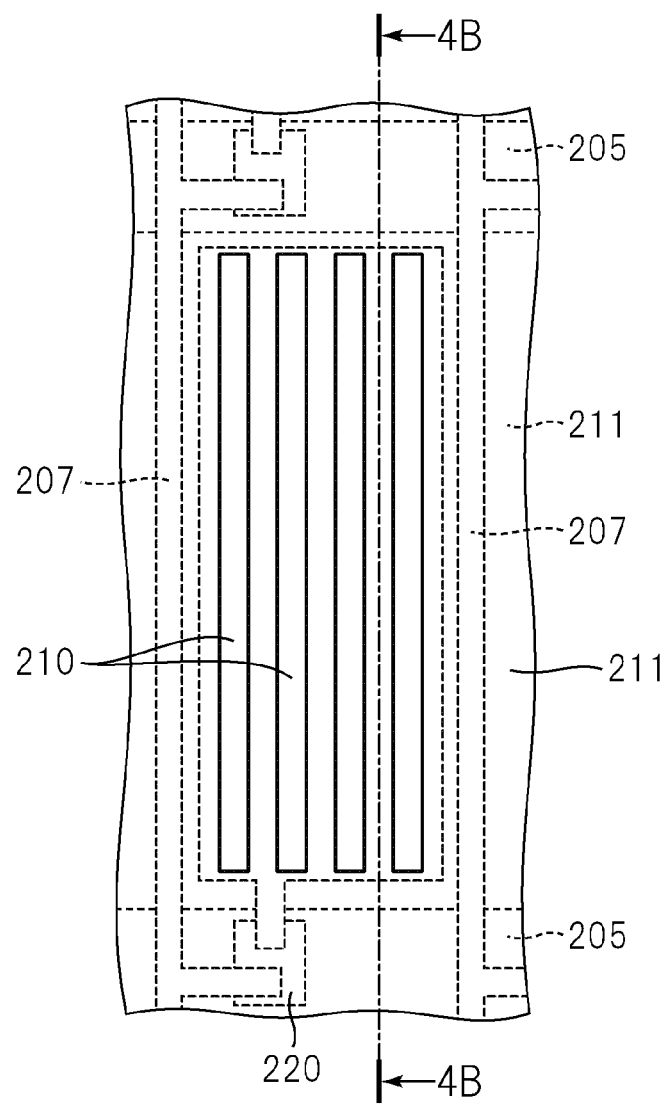
FIG. 4A is a top view of the vicinity of the n-th pixel circuit according to the embodiments of the present invention.
Figure 4B:
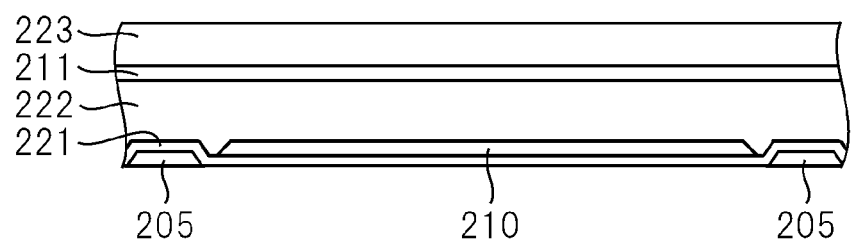
FIG. 4B is a cross-sectional view illustrating the cross section taken along the line 4B-4B of FIG. 4A.

FIG. 4A is a top view of the vicinity of the n-th pixel circuit. The pixel circuit according to the first embodiment has a common top structure in which the reference electrode 111 (common electrode) is disposed above the pixel electrode 110. FIG. 4B is a cross-sectional view illustrating the cross section taken along the line 4B-4B of FIG. 4A.

On a transparent substrate (not shown) such as a glass substrate, an anti-contamination film (not shown) is formed for preventing contamination of impurities from the transparent substrate. Gate electrode films 205 illustrated in FIG. 4A are further formed thereon. FIG. 3 illustrates the gate (gate electrode) of the TFT 109 and the gate signal line 105 separately, but actually, the gate of the TFT 109 and the gate signal line 105 are formed in a single gate electrode film 205. In the lower side of FIG. 4A, the gate of the TFT 109, of the n-th pixel circuit and the n-th gate signal line 105, connected to the TFT 109, are illustrated as a single gate electrode film 205. In the upper side of FIG. 4A, the gate of the TFT $109_{n-1}$ of the (n−1)th pixel circuit, which is disposed on the upper side of the n-th pixel circuit, and the (n−1)th gate signal line $105_{n-1}$ connected to the TFT $109_{n-1}$ are illustrated as a single gate electrode film 205. In other words, the two gate electrode films 205 in total are illustrated in FIG. 4A.

A gate insulating film 221 (see FIG. 4B) is formed so as to cover the gate electrode films 205, and a semiconductor film 220 is formed thereon. Here, the semiconductor film 220 is made of, for example, amorphous silicon, but may be made of polycrystalline silicon or monocrystalline silicon, or another semiconductor.

Data signal line films 207 are formed on both sides of FIG. 4A along the vertical direction thereof. A pixel electrode film 210 is formed at the center of FIG. 4A. Similarly to the gate electrode films 205, FIG. 3 illustrates the input side of the TFT 109 and the data signal line 107 separately, but actually, the input side of the TFT 109 and the data signal line 107 are formed in a single data signal line film 207. In FIG. 4A, the data signal line film 207 including the input side of the TFT $109_n$ of the n-th pixel circuit and one data signal line 107 extending in the vertical direction is illustrated on the left side, and the data signal line film 207 including another data signal line 107 is illustrated on the right side. Similarly, the output side of the TFT $109_n$ and the pixel electrode $110_n$ are formed in a single pixel electrode film 210.

An insulating film 222 (see FIG. 4B) is formed so as to cover the data signal line films 207 and the pixel electrode film 210, and a reference electrode film 211 is formed thereon. FIG. 3 illustrates the reference electrodes 111 of the pixel circuits and the plurality of reference voltage lines 108 separately, but actually, the plurality of reference electrodes 111 and the plurality of reference voltage lines 108 are formed in a single reference electrode film 211. In the reference electrode film 211, slits (gaps) are provided in a region above the pixel electrode film 210 of the respective pixel circuits. Owing to the potential difference generated between the pixel electrode film 210 and the reference electrode film 211, an electric field applied above the slits has a component in the horizontal direction of FIG. 4B. Note that, a protective insulating film 223 is formed on the reference electrode film 211, and the liquid crystal molecules are sealed above the protective insulating film. The reference electrode film 211 illustrated in FIG. 4A has four slits extending in the vertical direction of the figure. Below the four slits, the pixel electrode film 210 is disposed through the intermediation of the insulating film 222.

The common top structure of the pixel circuit is a structure in which the reference electrode 111 (reference electrode film 211) is formed (laminated) further from (above) the pixel electrode 110 (pixel electrode film 210) with respect to the gate signal line 105 (gate electrode film 205). In addition to the common top structure, the pixel circuit in the IPS liquid crystal display device can also employ a source top structure in which the pixel electrode is disposed above the reference electrode. In the source top structure, the output side (source electrode) of the TFT is formed in a source electrode film, and the source electrode film (source electrode), a reference electrode film (reference electrode), and a pixel electrode film (pixel electrode) are formed in order from the bottom of a TFT substrate through the intermediation of an insulating film. The reference electrode film is formed in a predetermined shape, and hence a through hole is formed in a region without the reference electrode film, and the source electrode film and the pixel electrode film are electrically connected to each other via the through hole. Further, the source electrode film and the pixel electrode film are electrically insulated from the reference electrode film. Note that, this structure is called the source top structure because the pixel electrode that is electrically connected to the source electrode is formed above the reference electrode. In the source top structure, a region of the reference electrode film to become the reference electrode is formed in a planar shape, and contrary, a region of the pixel electrode film to become the pixel electrode is formed in an interdigit shape. Note that, an electric field applied above regions between the teeth of the interdigit shape of the pixel electrode film has a component in the horizontal direction.

In the case where the pixel circuit has the common top structure, it is unnecessary to provide a through hole as in the source top structure, and thus the aperture ratio is improved. The common top structure has another advantage that the manufacturing process can be simplified because the source electrode and the pixel electrode are formed in the same pixel electrode film. On the contrary, unlike the source top structure, the pixel electrode film 210 having a large region, namely the pixel electrode 110, is formed in the vicinity of the gate electrode films 205 through the intermediation of the gate insulating film 221.

As illustrated in FIG. 4B, the distance between the end of the gate electrode film 205 and the end of the pixel electrode film 210 is short, and hence a parasitic capacitance is generated between the gate electrode film 205 and the pixel electrode film 210. In other words, the common top structure has the feature that a larger parasitic capacitance is generated between the gate electrode film 205 and the pixel electrode film 210 than in the source top structure. Here, in the n-th pixel circuit, the TFT $109_n$ is disposed on the lower side of FIG. 4A, and in the n-th pixel circuit, a parasitic capacitance $C_{gp1}$ is generated between the pixel electrode film 210 (pixel electrode $110_n$) and the gate electrode film 205 (n-th gate signal line $105_n$) on the lower side of the figure including the gate (gate electrode) of the TFT $109_n$, and a parasitic capacitance $C_{gp2}$ is generated between the pixel electrode film 210 (pixel electrode $110_n$) of the n-th pixel circuit and the gate electrode film 205 ((n−1)th gate signal line $105_{n-1}$) on the upper side of the figure.

Figure 9:
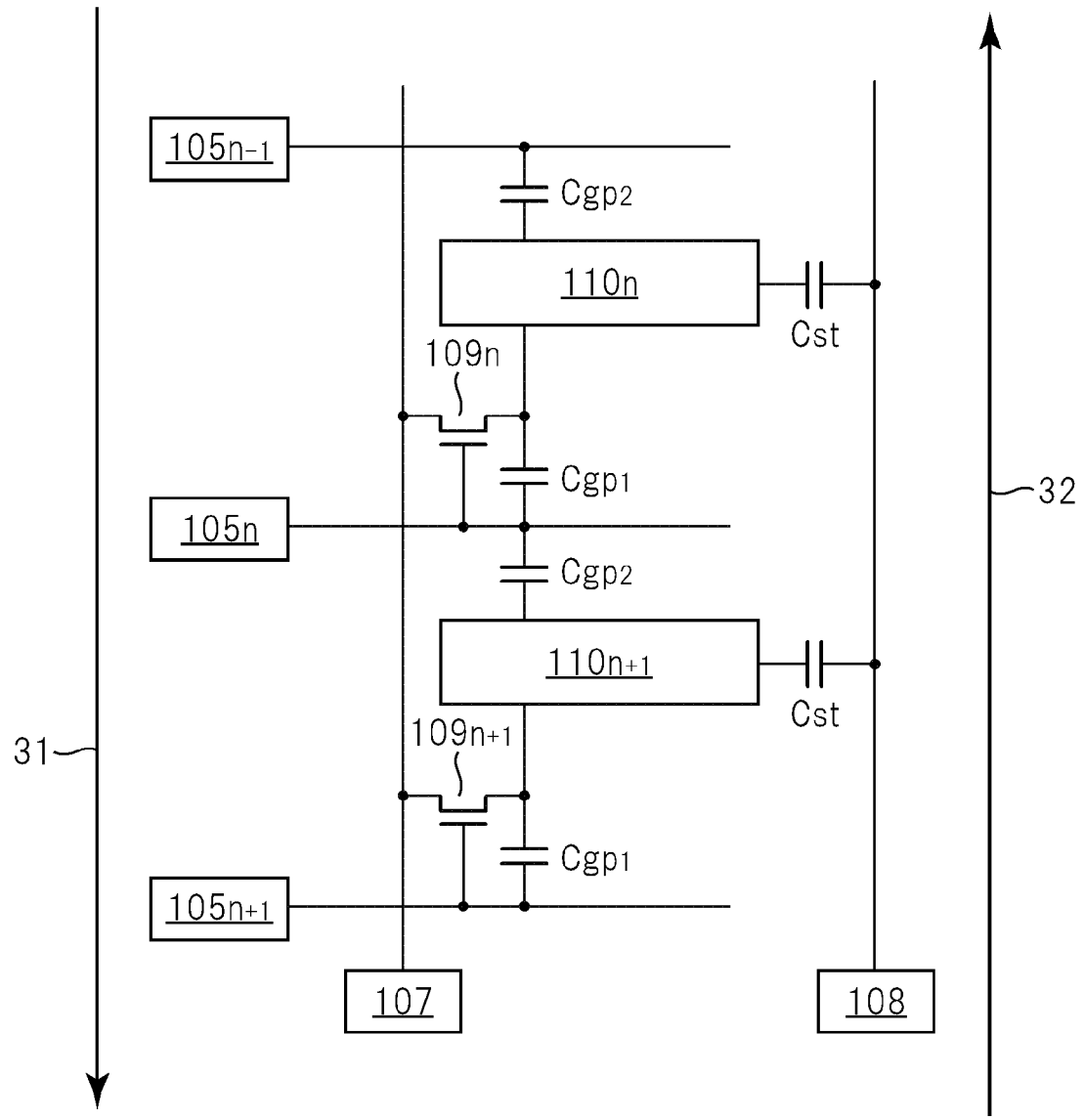
FIG. 9 is a circuit diagram of pixel circuits in a commonly-used display device.

As illustrated in FIG. 9, a pixel capacitance $C_{st}$ is formed between the pixel electrode 110 and the reference electrode 111, and the pixel capacitance $C_{st}$ is charged with a display control voltage supplied to the data signal line 107 during data writing. However, at the end of data writing, the voltage of the gate signal line 105 changes from the ON voltage to the OFF voltage, and the potential of the pixel electrode 110 of a corresponding pixel circuit or an adjacent pixel circuit changes due to coupling with the parasitic capacitances present between the gate signal lines 105 and the pixel electrode 110.

In the n-th pixel circuit according to the first embodiment, the parasitic capacitance $C_{gp1}$ is present between the pixel electrode $110_n$ and the n-th gate signal line $105_n$, and the parasitic capacitance $C_{gp2}$ is present between the pixel electrode $110_n$ and the (n−1)th gate signal line $105_{n-1}$. It is assumed that the potential difference between the ON voltage and the OFF voltage of the gate signal is a voltage $V_0$. When the voltage of the n-th gate signal line $105_n$ changes from the ON voltage to the OFF voltage, the voltage of the pixel electrode $110_n$ changes by a voltage $V_1$, which can be expressed by Equation 1: $V_1=(C_{gp1}/C_{st})\cdot V_0$. Similarly, when the voltage of the (n−1)th gate signal line $105_{n-1}$ changes from the ON voltage to the OFF voltage, the voltage of the pixel electrode 110 changes by a voltage $V_2$, which can be expressed by Equation 2: $V_2=(C_{gp2}/C_{st})\cdot V_0$.

Figure 5A:
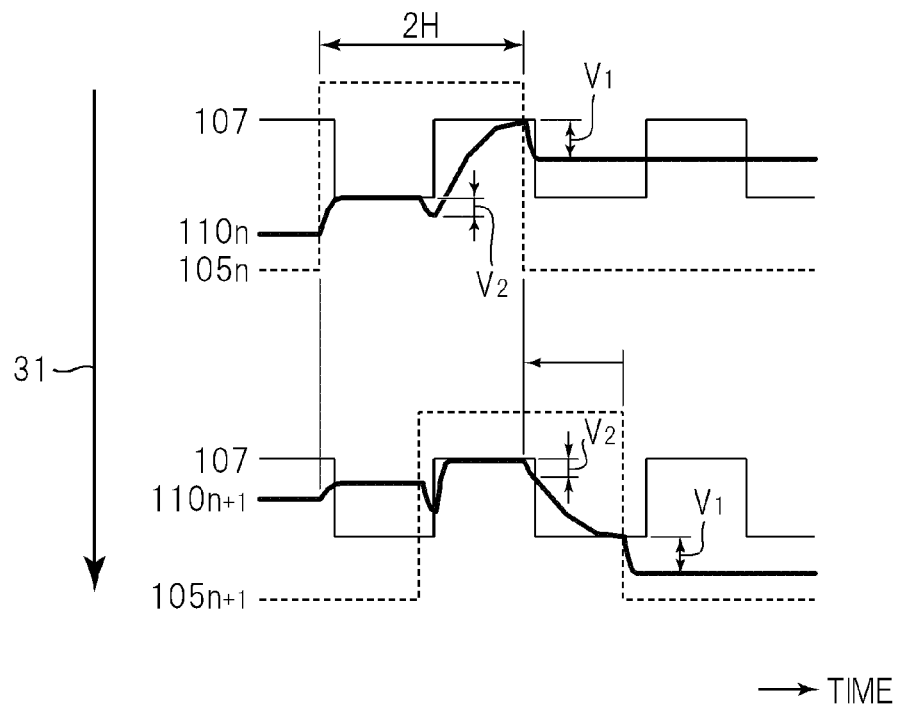
FIG. 5A is a graph illustrating how to drive the n-th pixel circuit and the (n+1)th pixel circuit according to the embodiments of the present invention in forward scanning driving.
Figure 5B:
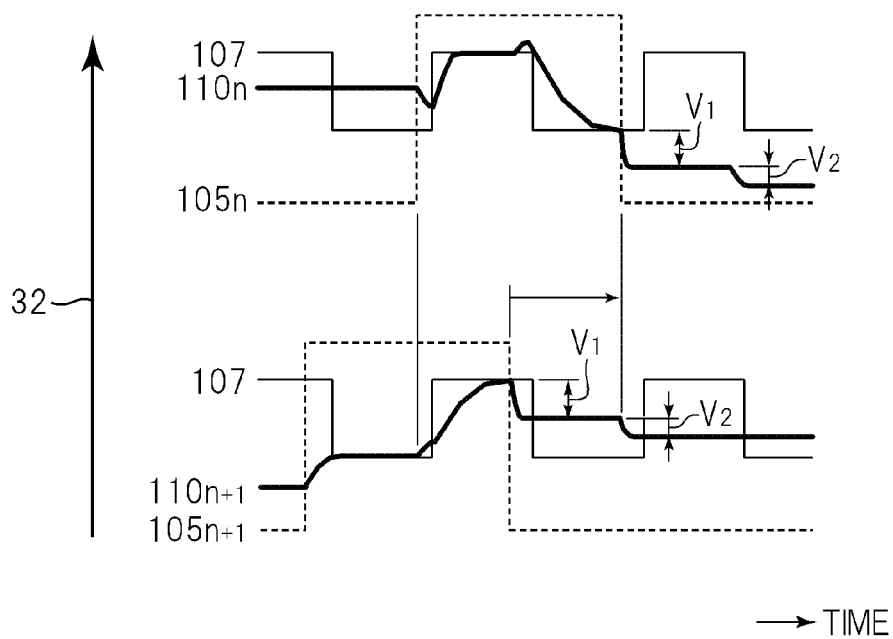
FIG. 5B is a graph illustrating how to drive the n-th pixel circuit and the (n+1)th pixel circuit according to the embodiments of the present invention in backward scanning driving.

FIGS. 5A and 5B illustrate how to drive the n-th pixel circuit and the (n+1)th pixel circuit in the forward scanning driving and the backward scanning driving, respectively. The upper side of FIGS. 5A and 5B illustrates the driving of the n-th pixel circuit, and the lower side thereof illustrates the driving of the (n+1)th pixel circuit. In FIG. 5A, the pixel circuits are scanned in order from top to bottom of the figure (forward direction 31). In FIG. 5B, the pixel circuits are scanned in order from bottom to top of the figure (backward direction 32).

FIGS. 5A and 5B illustrate voltages supplied to the gate signal lines 105, voltages supplied to the data signal lines 107, and voltages supplied to the pixel electrodes 110 in the driving of the respective pixel circuits in timelines. In FIGS. 5A and 5B, the ON voltage of the gate signal is High voltage and the OFF voltage is Low voltage.

As described above, the gate signal line driving circuit performs the gate overlapping driving, where a gate signal ON period lasts for about two horizontal periods (2H). Accordingly, the voltage of the n-th gate signal line 105, becomes the High voltage in a horizontal period (H) for writing data into the adjacent (n−1)th pixel circuit and also becomes the High voltage in a horizontal period (H) for writing data into the n-th pixel circuit itself.

First, as illustrated in the upper side of FIG. 5A, how to drive the n-th pixel circuit in the forward scanning driving is described. The sign of the display control voltage supplied to the (n−1)th pixel circuit is negative, and the sign of the display control voltage supplied to the n-th pixel circuit is positive. Accordingly, in two horizontal periods (2H) in which the voltage of the n-th gate signal line 105 becomes the High voltage, the voltage of the data signal line 107 is negative in the first horizontal period (H) and positive in the second horizontal period (H). For simple description, FIGS. 5A and 5B illustrate the case where the pixel circuits arranged in line have the same display data. In other words, the display control voltages supplied to the plurality of pixel circuits arranged in line have a constant absolute value with respect to the reference electrodes 111, though the signs are different in turn between the positive and the negative.

In the two horizontal periods (2H) in which the voltage of the n-th gate signal line $105_n$ becomes the High voltage, at a time when the first horizontal period (H) ends, data writing into the (n−1)th pixel circuit is finished. At this time, the voltage of the (n−1)th gate signal line $105_{n-1}$ changes from the High voltage to the Low voltage. In the n-th pixel circuit, the voltage reduction by the voltage $V_2$ occurs because of the parasitic capacitance $C_{gp2}$ present between the pixel electrode $110_n$ and the (n−1)th gate signal line $105_{n-1}$. Then, at this time, the display control voltage supplied to the data signal line 107 changes to the display control voltage supplied to the n-th pixel circuit. In other words, the sign of the voltage of the data signal line 107 changes from the negative to the positive.

In the two horizontal periods (2H), at a time when the second horizontal period (H) starts, the voltage reduction by the voltage $V_2$ occurs because of the parasitic capacitance $C_{gp2}$ as described above. However, during the second horizontal period (H), the voltage of the pixel electrode $110_n$ approximates the display control voltage corresponding to display data of the n-th pixel circuit, and is therefore hardly affected by the voltage reduction by the voltage $V_2$.

Then, at a time when the second horizontal period (H) ends, data writing into the n-th pixel circuit is finished. At this time, the voltage of the n-th gate signal line $105_n$ changes from the High voltage to the Low voltage. In the n-th pixel circuit, the voltage reduction by the voltage $V_1$ occurs because of the parasitic capacitance $C_{gp1}$ present between the pixel electrode $110_n$ and the n-th gate signal line $105_n$, and the voltage of the n-th pixel electrode $110_n$ is maintained to a voltage which is lower than a desired display control voltage by the voltage $V_1$.

Next, as illustrated in the lower side of FIG. 5A, how to drive the (n+1)th pixel circuit in the forward scanning driving is described. The main difference between the driving in the n-th pixel circuit and the driving in the (n+1)th pixel circuit is the sign of the display control voltage supplied to the data signal line 107 in two horizontal periods (2H) in which the voltage of the gate signal line 105 becomes the High voltage. The sign of the display control voltage supplied to the n-th pixel circuit is positive, and the sign of the display control voltage supplied to the (n+1)th pixel circuit is negative. The sign of the voltage of the data signal line 107 is therefore opposite to that in the above-mentioned case.

In two horizontal periods (2H) in which the voltage of the (n+1)th gate signal line $105_{n+1}$ becomes the High voltage, at a time when the first horizontal period (H) ends, data writing into the n-th pixel circuit is finished. At this time, the voltage of the n-th gate signal line $105_n$ changes from the High voltage to the Low voltage. In the (n+1)th pixel circuit, similarly to the n-th pixel circuit, the voltage reduction by the voltage $V_2$ occurs because of the parasitic capacitance $C_{gp2}$ present between the pixel electrode $110_{n+1}$ and the n-th gate signal line $105_n$. Then, at this time, the voltage of the data signal line 107 changes to the display control voltage supplied to the (n+1)th pixel circuit. In other words, the sign of the voltage of the data signal line 107 changes from the positive to the negative.

In the two horizontal periods (2H), at a time when the second horizontal period (H) starts, the voltage reduction by the voltage $V_2$ occurs because of the parasitic capacitance $C_{gp2}$ as described above. However, during the second horizontal period (H), the voltage of the pixel electrode $110_{n+1}$ approximates the display control voltage corresponding to display data of the (n+1)th pixel circuit, and is therefore hardly affected by the voltage reduction by the voltage $V_2$.

Then, at a time when the second horizontal period (H) ends, data writing into the (n+1)th pixel circuit is finished. At this time, the voltage of the (n+1)th gate signal line $105_{n+1}$ changes from the High voltage to the Low voltage. In the (n+1)th pixel circuit, the voltage reduction by the voltage $V_1$ occurs because of the parasitic capacitance $C_{gp1}$ present between the pixel electrode $110_{n+1}$ and the (n+1)th gate signal line $105_{n+1}$, and the voltage of the (n+1)th pixel electrode $110_n$ is maintained to a voltage which is lower than a desired display control voltage by the voltage $V_1$.

In other words, when the data signal line driving circuit 115 performs the data signal inversion driving and the gate signal line driving circuit performs the forward scanning driving, the pixel electrode 110 of the pixel circuit to which the display control voltage having the positive sign is supplied and the pixel electrode 110 of the pixel circuit to which the display control voltage having the negative sign is supplied are both maintained to have a voltage which is lower than a desired display control voltage by the voltage $V_1$, as compared to the case where the parasitic capacitances between the pixel electrode 110 and adjacent two of the gate signal lines 105 can be ignored.

In contrast, how to perform backward scanning driving is described. First, as illustrated in the lower side of FIG. 5B, how to drive the (n+1)th pixel circuit in the backward scanning driving is described. In the (n+1)th pixel circuit, in two horizontal periods (2H) in which the voltage of the (n+1)th gate signal line $105_{n+1}$ becomes the High voltage, at a time when the first horizontal period (H) ends, data writing into the (n+2)th pixel circuit is finished. At this time, the voltage of the (n+2)th gate signal line $105_{n+2}$ changes from the High voltage to the Low voltage. However, in the (n+1)th pixel circuit, the pixel electrode $110_{n+1}$ forms a smaller parasitic capacitance with the (n+2)th gate signal line $105_{n+2}$ than the parasitic capacitance $C_{gp1}$ with the (n+1)th gate signal line $105_{n+1}$ and the parasitic capacitance $C_{gp2}$ with the n-th gate signal line $105_n$. Therefore, the voltage fluctuation at this time is small. Even if the parasitic capacitance of the pixel electrode $110_{n+1}$ is too large to ignore, in the second horizontal period (H), the voltage of the pixel electrode $110_{n+1}$ approximates the display control voltage corresponding to the display data of the (n+1) th pixel circuit as described above, and is therefore hardly affected by the voltage fluctuation.

In addition, at this time, the display control voltage supplied to the data signal line 107 changes to the display control voltage supplied to the (n+1)th pixel circuit. In other words, the sign of the voltage of the data signal line 107 changes from the negative to the positive. Then, at a time when the second horizontal period (H) ends, data writing into the (n+1)th pixel circuit is finished. At this time, the voltage of the (n+1)th gate signal line $105_{n+1}$ changes from the High voltage to the Low voltage. In the (n+1)th pixel circuit, the voltage reduction by the voltage $V_1$ occurs because of the parasitic capacitance $C_{gp1}$ present between the pixel electrode $110_{n+1}$ and the (n+1) th gate signal line $105_{n+1}$. After another horizontal period (H) has elapsed since this time, the voltage of the n-th gate signal line 105, changes from the High voltage to the Low voltage, and the voltage of the pixel electrode $110_{n+1}$ is therefore reduced further by the voltage $V_2$ because of the parasitic capacitance $C_{gp2}$ present between the pixel electrode $110_{n+1}$ and the n-th gate signal line $105_n$. Accordingly, the pixel electrode $110_{n+1}$ of the (n+1)th pixel circuit is maintained to have a voltage which is lower than a desired display control voltage by the sum of the voltage $V_1$ and the voltage $V_2$.

Next, as illustrated in the upper side of FIG. 5B, how to drive the n-th pixel circuit in the backward scanning driving is described. Similarly to the forward scanning driving, the main difference between the driving in the n-th pixel circuit and the driving in the (n+1)th pixel circuit is the sign of the display control voltage supplied to the data signal line 107 in two horizontal periods (2H) in which the gate signal output to the gate signal line 105 becomes the High voltage. The sign of the display control voltage supplied to the (n+1)th pixel circuit is positive, and the sign of the display control voltage supplied to the n-th pixel circuit is negative. The sign of the display control voltage supplied to the data signal line 107 is therefore opposite to that in the above-mentioned case.

Accordingly, in two horizontal periods (2H) in which the gate signal of the n-th gate signal line $105_n$ becomes the High voltage, at a time when the first horizontal period (H) ends, the gate signal of the (n+1)th gate signal line $105_{n+1}$ changes from the High voltage to the Low voltage. However, as described above, the pixel electrode $110_n$ forms a small parasitic capacitance with the (n+1)th gate signal line $105_{n+1}$, and therefore the voltage fluctuation at this time is small.

In addition, at this time, the display control voltage supplied to the data signal line 107 changes to the display control voltage supplied to the n-th pixel circuit, and the sign of the display control voltage changes from the positive to the negative. Then, at a time when the second horizontal period (H) ends, data writing into the n-th pixel circuit is finished, and the gate signal of the n-th gate signal line $105_n$ changes from the High voltage to the Low voltage. In the n-th pixel circuit, the voltage reduction by the voltage $V_1$ occurs because of the parasitic capacitance $C_{gp1}$ present between the pixel electrode $110_n$ and the n-th gate signal line $105_n$. After another horizontal period (H) has elapsed since this time, the gate signal of the (n−1)th gate signal line $105_{n-1}$ changes from the High voltage to the Low voltage, and the voltage of the pixel electrode $110_n$ is therefore reduced further by the voltage $V_2$ because of the parasitic capacitance $C_{gp2}$ present between the pixel electrode $110_n$ and the (n−1)th gate signal line $105_{n-1}$. Accordingly, the pixel electrode $110_n$ of the n-th pixel circuit is maintained to have a voltage which is lower than a desired display control voltage by the sum of the voltage $V_1$ and the voltage $V_2$.

In other words, when the data signal line driving circuit 115 performs the data signal inversion driving and the gate signal line driving circuit performs the backward scanning driving, the pixel electrode 110 of the pixel circuit to which the display control voltage having the positive sign is supplied and the pixel electrode 110 of the pixel circuit to which the display control voltage having the negative sign is supplied are both maintained to have a voltage which is lower than a desired display control voltage by the sum of the voltage $V_1$ and the voltage $V_2$, as compared to the case where the parasitic capacitances between the pixel electrode 110 and adjacent two of the gate signal lines 105 can be ignored.

In conclusion, when the data signal line driving circuit 115 performs the data signal inversion driving, the voltage of the pixel electrode 110 of the pixel circuit to which the display control voltage having the positive sign is supplied and the voltage of the pixel electrode 110 of the pixel circuit to which the display control voltage having the negative sign is supplied are both reduced equally from their desired display control voltages because of the parasitic capacitances between the pixel electrodes 110 and adjacent two of the gate signal lines 105, but the reduced level of the voltages are different between the forward scanning driving and the backward scanning driving.

Figure 6:
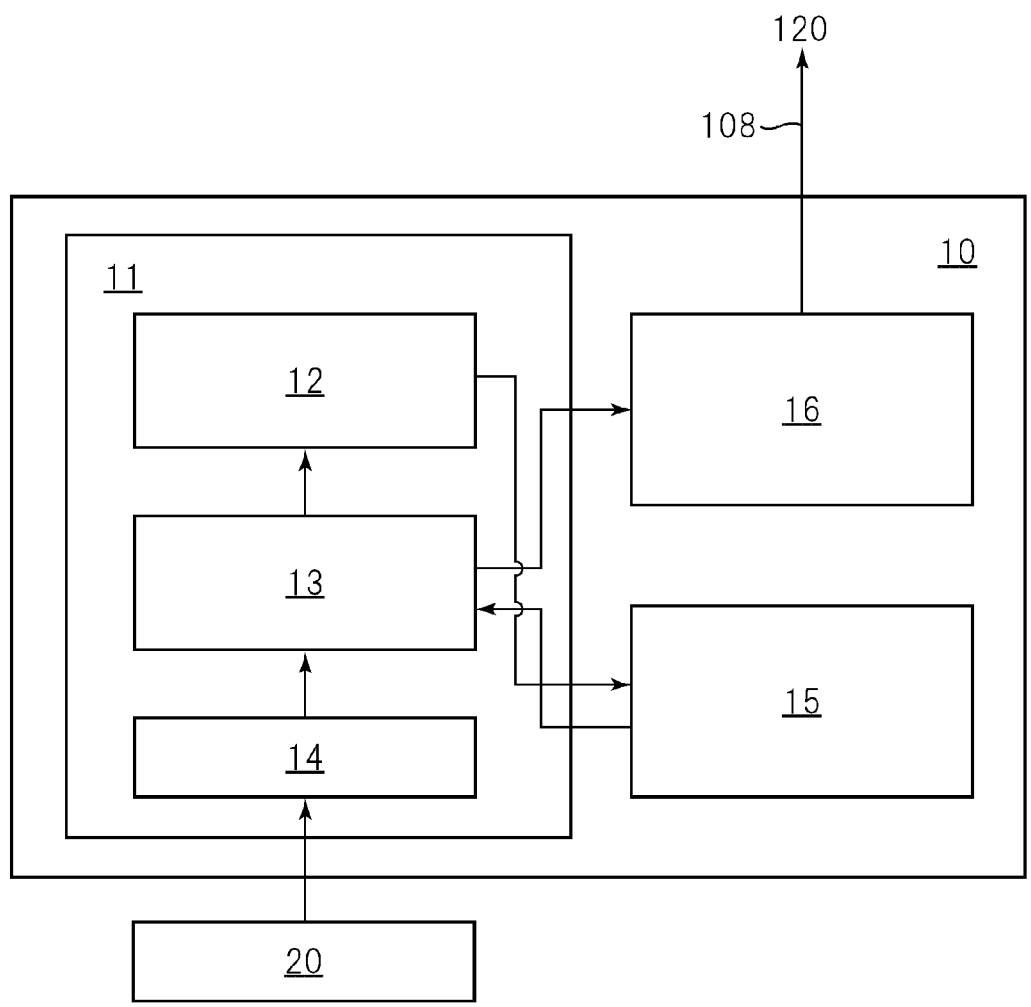
FIG. 6 is a conceptual block diagram of a reference voltage line driving circuit according to the embodiments of the present invention.

FIG. 6 is a conceptual block diagram of the reference voltage line driving circuit 10 according to the first embodiment. The reference voltage line driving circuit 10 includes a logic circuit 11, a reference voltage generation circuit 16, and a storage portion 15. The storage portion 15 may be, for example, a non-volatile memory. The logic circuit 11 includes a memory write circuit 12, a control register circuit 13, and an interface circuit 14. A control signal is input to the interface circuit 14 from an external system 20 provided outside the reference voltage line driving circuit 10.

In the reference voltage line driving circuit provided in the driver IC in the related art, voltage information for determining a single reference voltage is stored, and a control register circuit controls the single reference voltage. On the other hand, the feature of the reference voltage line driving circuit 10 according to the first embodiment resides in that the storage portion 15 stores voltage information for determining a reference voltage $V_{comF}$ for forward scanning driving (reference voltage for forward direction) and a reference voltage $V_{comB}$ for backward scanning driving (reference voltage for reverse direction), and the control register circuit 13 controls the reference voltage $V_{comF}$ for forward scanning driving and the reference voltage $V_{comB}$ for backward scanning driving.

As described above, the reference voltage line driving circuit 10 according to the first embodiment performs the fixed reference voltage driving. In other words, both the reference voltage $V_{comF}$ for forward scanning driving and the reference voltage $V_{comB}$ for backward scanning driving are direct voltages.

Under control of the control register circuit 13, the memory write circuit 12 stores a value of the reference voltage $V_{comF}$ for forward scanning driving and a value of the reference voltage $V_{comB}$ for backward scanning driving in the storage portion 15. In other words, it is desired that the voltage information to be stored in the storage portion 15 be two-valued information of the reference voltage $V_{comF}$ for forward scanning driving and the reference voltage $V_{comB}$ for backward scanning driving. In the driving of the display device, after the driver IC 134 is powered on, the control register circuit 13 reads out the values of the reference voltage $V_{comF}$ for forward scanning driving and the reference voltage $V_{comB}$ for backward scanning driving stored in the storage portion 15, and stores the read values in internal registers.

In changing the scanning direction for scanning driving, the control signal is input to the interface circuit 14 from the external system 20. In accordance with the control signal and based on the voltage information stored in the storage portion 15, the control register circuit 13 calculates a reference voltage to be output and controls the reference voltage generation circuit 16. The reference voltage generation circuit 16 then supplies the reference voltage $V_{comF}$ for forward scanning driving during the forward scanning driving and the reference voltage $V_{comB}$ for backward scanning driving during the backward scanning driving, to the reference voltage line 108 as the reference voltage. The reference voltage is supplied to the reference electrodes 111 of the respective pixel circuits of the display portion 120 via the reference voltage lines 108.

Based on the two-valued voltage information stored in the storage portion 15, the reference voltage line driving circuit 10 supplies the reference voltage $V_{comF}$ for forward scanning driving during the forward scanning driving and the reference voltage $V_{comB}$ for backward scanning driving during the backward scanning driving, to the reference electrodes 111 of the respective pixel circuits, to thereby suppress the difference in display control voltage occurring between the forward scanning driving and the backward scanning driving and also suppress the fluctuations caused by the parasitic capacitances. The display quality can thus be improved.

Note that, as described above, when assuming the same desired display control voltage, the voltage that the pixel electrode 110 maintains in the forward scanning driving is higher than the voltage that the pixel electrode 110 maintains in the backward scanning driving by the voltage $V_2$. Considering this voltage difference, it is desired that the reference voltage $V_{comF}$ for forward scanning driving be higher than the reference voltage $V_{comB}$ for backward scanning driving by the voltage $V_2$, which is caused by the parasitic capacitance $C_{gp2}$. Further, the voltage that the pixel electrode 110 maintains in the forward scanning driving is lower by the voltage $V_1$ than in the case where the parasitic capacitances generated between the pixel electrode 110 and the gate signal lines 105 can be ignored. Considering the voltage difference, it is desired that the reference voltage $V_{comF}$ for forward scanning driving be lower by the voltage $V_1$ than in the case where the parasitic capacitances can be ignored.

In the first embodiment, the voltage information to be stored in the storage portion 15 is the value of the reference voltage $V_{comF}$ for forward scanning driving and the value of the reference voltage $V_{comB}$ for backward scanning driving, but the voltage information may be another voltage information as long as the reference voltage $V_{comF}$ for forward scanning driving and the reference voltage $V_{comB}$ for backward scanning driving can be generated based on the information stored in the storage portion 15. For example, the voltage information may be values obtained by adding or subtracting a predetermined value to or from the value of the reference voltage $V_{comF}$ for forward scanning driving and the value of the reference voltage $V_{comB}$ for backward scanning driving.

Figure 7:
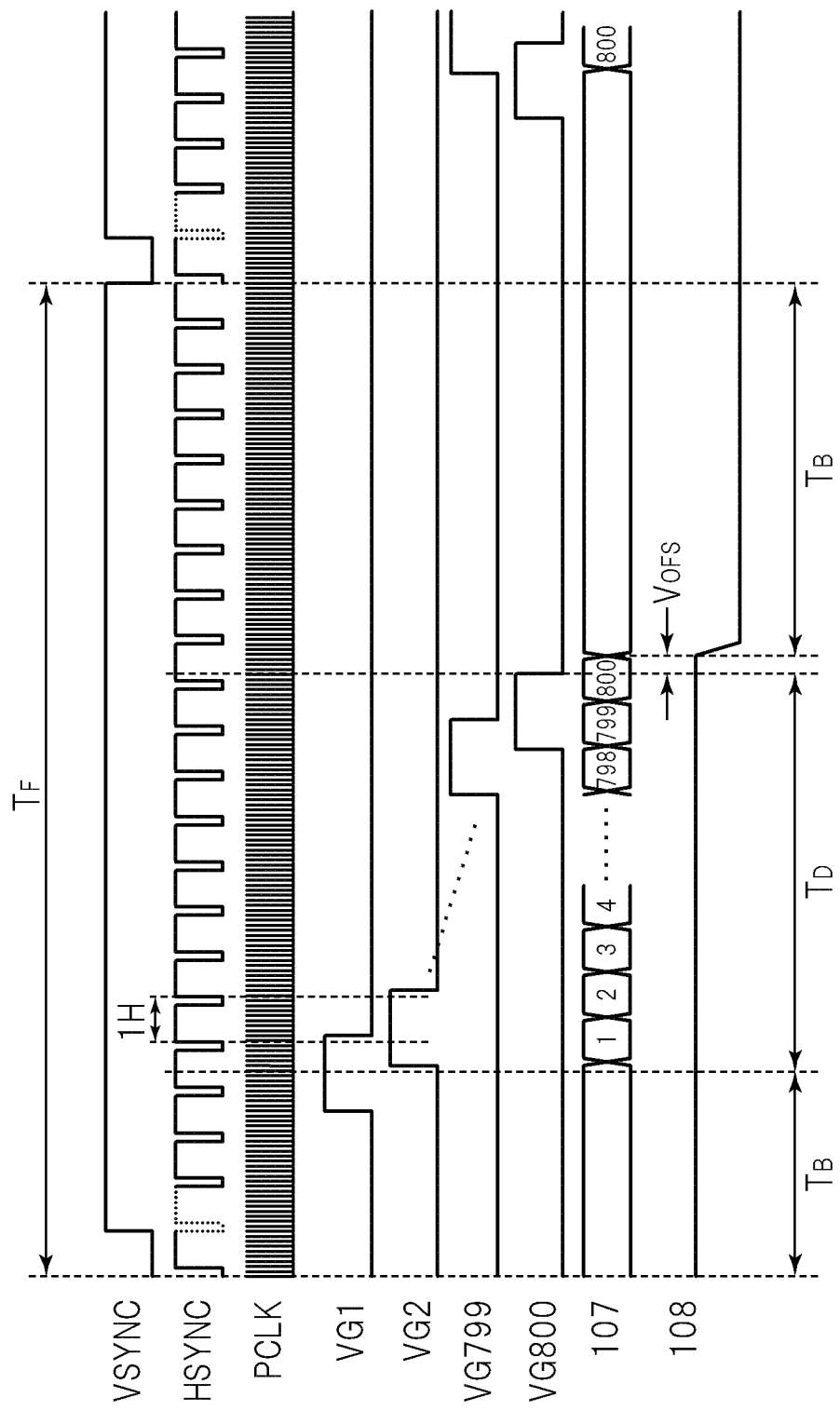
FIG. 7 is a graph illustrating image display driving performed by the liquid crystal display device according to a first embodiment of the present invention.

FIG. 7 is a graph illustrating image display driving performed by the liquid crystal display device according to the first embodiment. FIG. 7 illustrates the timing of changing from forward scanning driving to backward scanning driving. A period for writing display data of one frame is one frame period $T_F$. A vertical synchronization signal $V_{SYNC}$ is a signal whose cycle is the one frame period. Based on the vertical synchronization signal $V_{SYNC}$, the write timing for display data of one frame can be measured. A horizontal synchronization signal $H_{SYNC}$ is a signal whose cycle is the above-mentioned one horizontal period (H). Based on the horizontal synchronization signal $H_{SYNC}$, the write timing for display data of one pixel circuit can be measured. Here, a signal $P_{CLK}$ is a clock signal.

In the one frame period $T_F$, a blanking period $T_B$ is followed by a data write period $T_D$. In the data write period $T_D$, write driving for display data into the plurality of pixel circuits is performed. In response thereto, the gate signals are sequentially controlled to the High voltage. FIG. 7 illustrates forward scanning driving in which the gate signals are sequentially controlled to the High voltage in order from the 1st gate signal $V_{G1}$ to the 800th gate signal $V_{G800}$. Further, as described above, the gate signal line driving circuit performs the gate overlapping driving, where a gate signal ON period in which the gate signal becomes the High voltage overlaps another gate signal ON period in which an adjacent gate signal becomes the High voltage.

As described above, the data signal line 107 is supplied with the display control voltage corresponding to display data of a pixel circuit to be driven for writing. FIG. 7 illustrates the display control voltage corresponding to display data of the 1st pixel circuit to the 800th pixel circuit, which is supplied in the data write period $T_D$. The reference voltage line 108 is supplied with the reference voltage $V_{comF}$ for forward scanning driving, which is supplied for performing the forward scanning driving.

In the one frame period $T_F$, the forward scanning driving is performed, but in the next frame period $T_F$, the driving is changed to backward scanning driving. In response to the change, in the blanking period $T_B$ following the data write period $T_D$, the reference voltage supplied to the reference voltage line 108 changes from the reference voltage $V_{comF}$ for forward scanning driving to the reference voltage $V_{comB}$ for backward scanning driving. However, it is desired that the timing of changing the reference voltage be a timing immediately after a gate signal to a pixel circuit for which write driving of display data is performed last has changed from the High voltage to the Low voltage. Note that, an offset period $V_{OFS}$ illustrated in FIG. 7 is an offset period that is provided for allowing the last gate signal to change to the Low voltage completely, and the offset period $V_{OFS}$ is provided for preventing the reference voltage from fluctuating during the write driving of display data into the last pixel circuit.

Note that, the first embodiment has been described above for the case where the sign of the display control voltage, which is supplied to each data signal line 107 by the data signal line driving circuit 115, changes alternately every horizontal period (H), but the present invention is not limited to thereto. Another type of driving may be employed in which the sign of the display control voltage supplied to each data signal line 107 is the same all the time in one frame period and in which the sign changes alternately every frame period or every predetermined number of frame periods. The present invention is also applicable to the frame inversion method, where the signs of the display control voltages supplied to the plurality of data signal lines 107 connected to the data signal line driving circuit 115 are all the same in one frame period, and the column inversion method, where the signs of the display control voltages are different for adjacent data signal lines 107.

[Second Embodiment]

A basic configuration of a display device according to a second embodiment of the present invention is the same as that of the display device according to the first embodiment. The second embodiment is mainly different from the first embodiment in that the reference voltage line driving circuit 10 according to the second embodiment performs alternating reference voltage driving while the reference voltage line driving circuit 10 according to the first embodiment performs the fixed reference voltage driving.

Here, the alternating reference voltage driving refers to the following. As described above, the data signal line driving circuit 115 performs the data signal inversion driving, such as line inversion or frame inversion, and the display control voltage supplied to the pixel electrode 110 of the pixel circuit has the positive or negative sign. When the display control voltage having the positive sign is supplied to the pixel electrode 110 of the pixel circuit, a reference voltage having the negative sign (Low voltage) is supplied to the reference electrode 111 of the pixel circuit. When the display control voltage having the negative sign is supplied to the pixel electrode 110 of the pixel circuit, a reference voltage having the positive sign (High voltage) is supplied to the reference electrode 111 of the pixel circuit. In other words, the reference voltage is an alternating voltage that repeats the Low voltage and the High voltage alternately at a predetermined cycle. Here, the difference between the reference voltage having the positive sign (High voltage) and the reference voltage having the negative sign (Low voltage) is referred to as amplitude value.

Image display is controlled by the voltage of the pixel electrode 110 with respect to the reference electrode 111. By performing the alternating reference voltage driving, the difference between the display control voltage having the positive sign and the display control voltage having the negative sign can be reduced in the data signal inversion driving, thus suppressing power consumption.

As described above, the data signal line driving circuit 115 performs the data signal inversion driving. In the case of line inversion driving, during one frame period, the reference voltage having the positive sign and the reference voltage having the negative sign are supplied alternately to the plurality of reference voltage lines 108 arranged in the vertical direction illustrated in FIG. 3. In other words, for example, when the reference voltage having the positive sign is supplied to the odd-numbered reference voltage lines 108 as counted from the top of the figure, the reference voltage having the negative sign is supplied to the even-numbered reference voltage lines 108. Alternatively, in the case where the plurality of reference electrodes 111 are formed as a single reference electrode film, and the number of the reference voltage lines 108 is one, the reference voltages having the positive and negative signs are supplied in cycles in synchronization with the signs of the display control voltages.

In performing the alternating reference voltage driving, in the reference voltage line driving circuit included in the driver IC of the related art, voltage information for determining a single reference voltage is stored, and the control register circuit controls the single reference voltage. On the other hand, the feature of the reference voltage line driving circuit 10 according to the second embodiment resides in that voltage information for determining the reference voltage $V_{comF}$ for forward scanning driving (reference voltage for forward direction) and the reference voltage $V_{comB}$ for backward scanning driving (reference voltage for reverse direction) is stored in the storage portion 15, and the control register circuit 13 controls the reference voltage $V_{comF}$ for forward scanning driving and the reference voltage $V_{comB}$ for backward scanning driving. Here, the voltage information for determining the single reference voltage in the related art is two-valued information of a reference value and an amplitude value of the reference voltage. The reference value of the reference voltage is, for example, one of the reference value having the positive sign (High voltage) and the reference value having the negative sign (Low voltage).

The amplitude values of the reference voltages are always the same between the forward scanning driving and the backward scanning driving. It is therefore desired that the voltage information to be stored in the storage portion 15 according to the second embodiment be three-valued information of a reference value of the reference voltage $V_{comF}$ for forward scanning driving, a reference value of the reference voltage $V_{comB}$ for backward scanning driving, and an amplitude value of both the reference voltages.

Based on the three-valued voltage information stored in the storage portion 15, the reference voltage line driving circuit 10 supplies the reference voltage $V_{comF}$ for forward scanning driving to the reference electrode 111 of each pixel circuit during the forward scanning driving, and supplies the reference voltage $V_{comB}$ for backward scanning driving to the reference electrode 111 of each pixel circuit during the backward scanning driving. With this, even in the alternating reference voltage driving, the difference in display control voltage occurring between the forward scanning driving and the backward scanning driving can be suppressed, and the fluctuations caused by the parasitic capacitances can also be suppressed. The display quality can thus be improved.

Note that, in the second embodiment, the voltage information to be stored in the storage portion 15 is three-valued information of the reference value of the reference voltage $V_{comF}$ for forward scanning driving, the reference value of the reference voltage $V_{comB}$ for backward scanning driving, and the amplitude value of both the reference voltages, but the voltage information may be another voltage information as long as the reference voltage $V_{comF}$ for forward scanning driving and the reference voltage $V_{comB}$ for backward scanning driving can be generated based on the voltage information stored in the storage portion 15. For example, the voltage information to be stored in the storage portion 15 may be three-valued information of a center value of the reference voltage $V_{comF}$ for forward scanning driving, a center value of the reference voltage $V_{comB}$ for backward scanning driving, and a half value of the amplitude value. Here, the center value is an average value between the reference voltage having the positive sign (High voltage) and the reference voltage having the negative sign (Low voltage). In this case, by adding or subtracting the half value of the amplitude value to or from the center values of the reference voltages, the reference voltage having the positive sign (High voltage) and the reference voltage having the negative sign (Low voltage) can be generated. Further, the reference value of the reference voltage $V_{comF}$ for forward scanning driving or the reference voltage $V_{comB}$ for backward scanning driving may be values obtained by adding or subtracting a predetermined value to or from one of the High voltage and the Low voltage.

[Third Embodiment]

A basic configuration of a display device according to a third embodiment of the present invention is the same as that of the display device according to each of the first embodiment and the second embodiment. The third embodiment is mainly different from the first and second embodiments in the voltage information to be stored in the storage portion 15 of the reference voltage line driving circuit 10 and in the control method of generating the reference voltage based on the voltage information stored in the storage portion 15.

First, similarly to the first embodiment, how the reference voltage line driving circuit 10 performs the fixed reference voltage driving is described. The voltage information to be stored in the storage portion 15 according to the first embodiment is, for example, two-valued information of the reference voltage $V_{comF}$ for forward scanning driving and the reference voltage $V_{comB}$ for backward scanning driving. On the other hand, the voltage information stored in the storage portion 15 according to the third embodiment is, for example, two-valued information of any one of the values of the reference voltage $V_{comF}$ for forward scanning driving and the reference voltage $V_{comB}$ for backward scanning driving and a difference value $\Delta V$ ($=V_{comF}-V_{comB}$) between the reference voltage $V_{comF}$ for forward scanning driving and the reference voltage $V_{comB}$ for backward scanning driving.

In changing the scanning direction for scanning driving, the control register circuit 13 shifts a reference voltage to be output, from a reference voltage before change, by the difference value $\Delta V$ stored in the storage portion 15, and controls the reference voltage generation circuit 16 with the resultant voltage as a changed reference voltage. Then, the reference voltage generation circuit 16 supplies, as a reference voltage, the reference voltage $V_{comF}$ for forward scanning driving during the forward scanning driving and the reference voltage $V_{comB}$ for backward scanning driving during the backward scanning driving, to the reference voltage line 108.

The reference voltage line driving circuit 10 according to the first embodiment stores in the storage portion 15, for example, the two-valued voltage information of the reference voltage $V_{comF}$ for forward scanning driving and the reference voltage $V_{comB}$ for backward scanning driving. On the other hand, the reference voltage line driving circuit 10 according to the third embodiment stores in the storage portion 15 the two-valued voltage information of any one of the values of the reference voltage $V_{comF}$ for forward scanning driving and the reference voltage $V_{comB}$ for backward scanning driving and the difference value $\Delta V$ therebetween. The voltage setting range of the difference value $\Delta V$ can be narrower than the voltage setting range of the reference voltage itself, thus reducing the information volume (number of bits) of the voltage information to be stored in the storage portion 15. As a result, an area required for the storage portion 15 and a register area provided in the control register circuit 13 can be reduced, to thereby cut down manufacturing cost of the driver IC 134. For example, when the voltage setting range of the reference voltage is set to 3 V and the voltage setting range of the difference value $\Delta V$ is set to 300 mV, the information volume of the voltage information necessary for performing voltage setting every 10 mV is 9 bits for the reference voltage and 5 bits for the difference value $\Delta V$.

The voltage information stored in the storage portion 15 may be an average value between the reference voltage $V_{comF}$ for forward scanning driving and the reference voltage $V_{comB}$ for backward scanning driving, and a half value of the difference value $\Delta V$ between the reference voltage $V_{comF}$ for forward scanning driving and the reference voltage $V_{comB}$ for backward scanning driving. In this case, by adding or subtracting the half value of the difference value $\Delta V$ to or from the average value, any one of the reference voltage $V_{comF}$ for forward scanning driving and the reference voltage $V_{comB}$ for backward scanning driving can be selected and generated.

Next, similarly to the second embodiment, how the reference voltage line driving circuit 10 performs the alternating reference voltage driving is described. The voltage information to be stored in the storage portion 15 according to the second embodiment is, for example, the three-valued information of the reference value of the reference voltage $V_{comF}$ for forward scanning driving, the reference value of the reference voltage $V_{comB}$ for backward scanning driving, and the amplitude value of both the reference voltages. On the other hand, the voltage information to be stored in the storage portion 15 according to the third embodiment is, for example, three-valued information of any one of the reference values of the reference voltage $V_{comF}$ for forward scanning driving and the reference voltage $V_{comB}$ for backward scanning driving, the amplitude value of the reference voltages, and a difference value $\Delta V$ ($=V_{comF}-V_{comB}$) between the reference voltage $V_{comF}$ for forward scanning driving and the reference voltage $V_{comB}$ for backward scanning driving. Here, the reference voltage $V_{comF}$ for forward scanning driving and the reference voltage $V_{comB}$ for backward scanning driving are each repeated at a predetermined cycle, and the difference value $\Delta V$ therebetween is a value of only the DC component. As compared to the second embodiment, the reference values of the reference voltages are replaced with the difference value $\Delta V$, thereby reducing the information volume of the voltage information to be stored in the storage portion 15.

The voltage information to be stored in the storage portion 15 according to the third embodiment may be three-valued information of an average value between the center value of the reference voltage $V_{comF}$ for forward scanning driving and the center value of the reference voltage $V_{comB}$ for backward scanning driving, a half value of the amplitude value, and a half value of the difference value $\Delta V$ (=$V_{comF}$-$V_{comB}$) between the reference voltage $V_{comF}$ for forward scanning driving and the reference voltage $V_{comB}$ for backward scanning driving. In this case, by adding or subtracting the half value of the difference value $\Delta V$ and the half value of the amplitude value to or from the average value, any one of the reference voltage $V_{comF}$ for forward scanning driving and the reference voltage $V_{comB}$ for backward scanning driving can be selected to generate a reference voltage having the positive sign (High voltage) and a reference voltage having the negative sign (Low voltage).

The voltage information stored in the storage portion 15 according to the third embodiment only needs to contain representative value information for determining one of the reference voltage $V_{comF}$ for forward scanning driving and the reference voltage $V_{comB}$ for backward scanning driving, and difference information for determining another one by using the representative value information. Here, the representative value information is, for example, any one of the reference values of the reference voltage $V_{comF}$ for forward scanning driving and the reference voltage $V_{comB}$ for backward scanning driving, and the amplitude value of the reference voltages. Here, the difference information may be the difference value $\Delta V$ between the reference voltage $V_{comF}$ for forward scanning driving and the reference voltage $V_{comB}$ for backward scanning driving, and may be another voltage information.

In the above, the display device according to the embodiments of the present invention has been exemplified as an IPS liquid crystal display device in which the pixel circuits have the common top structure. As described above, when the pixel circuits have the common top structure, the voltage of the pixel electrode changes because of the parasitic capacitance between the pixel electrode of the pixel circuit and an adjacent gate signal line, but the present invention can suppress the influence of such voltage change to improve the display quality. However, even for an IPS liquid crystal display device in which the pixel circuits have another structure, the present invention is applicable when a voltage change occurs in the pixel electrode because of the parasitic capacitance between the pixel electrode of the pixel circuit and an adjacent gate signal line.

Figure 8:
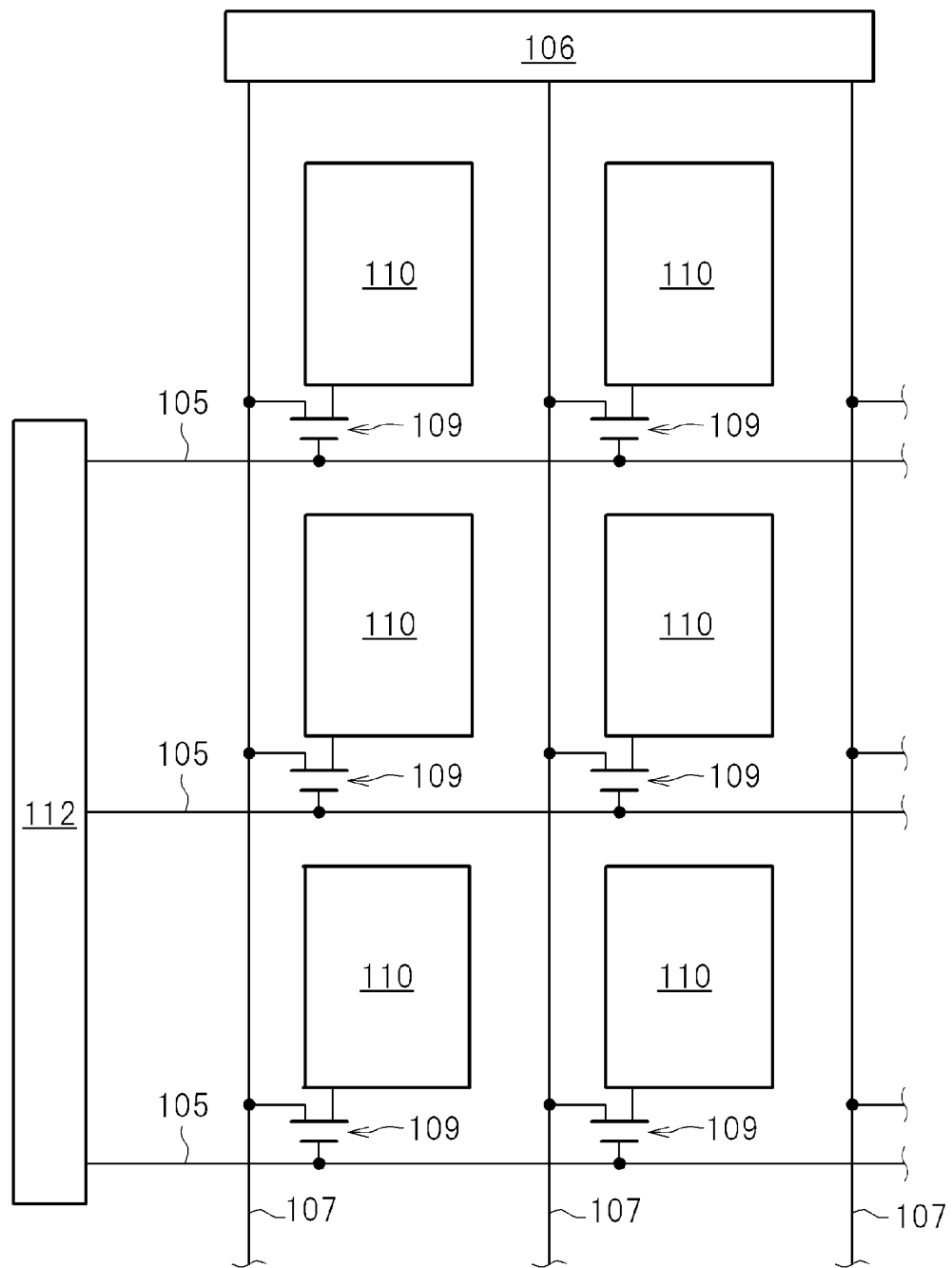
FIG. 8 is a conceptual diagram of an equivalent circuit of a TFT substrate provided in another type of the liquid crystal display device according to the embodiments of the present invention.

Even for liquid crystal display devices employing other driving method than the IPS, such as a vertically aligned (VA) liquid crystal display device and a twisted nematic (TN) liquid crystal display device, and for other display devices, the present invention is similarly applicable when a voltage change occurs in the pixel electrode of the pixel circuit because of the parasitic capacitance between the pixel electrode and an adjacent gate signal line. The present invention is not limited to the case where the voltage change is caused by the parasitic capacitance, but is also applicable to the case where a systematic voltage change occurs in the pixel electrode between the forward scanning driving and the backward scanning driving. FIG. 8 is a conceptual diagram of an equivalent circuit of the TFT substrate 102 provided in the VA liquid crystal display device or the TN liquid crystal display device. In the VA liquid crystal display device or the TN liquid crystal display device, the reference electrodes 111 are provided in the filter substrate 101 opposed to the TFT substrate 102.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device, comprising:
a data signal line;
a plurality of pixel circuits, which are connected to the data signal line and arranged in order;
a plurality of gate signal lines arranged in the arrangement order, each of which extends between adjacent ones of the plurality of pixel circuits and is connected to pixel circuits disposed on one side;
a gate signal line driving circuit for selecting any one of a forward scanning driving with a forward direction and a backward scanning driving with a reverse direction to the arrangement order as time passes, and outputting a plurality of gate signals that are controlled to an ON voltage sequentially in the selected scanning driving, to the plurality of gate signal lines arranged in the arrangement order;
a data signal line driving circuit for selecting one of the plurality of pixel circuits and supplying a display control voltage corresponding to display data of the selected pixel circuit to the data signal line; and
a reference voltage line driving circuit for supplying a reference voltage corresponding to each of the plurality of pixel circuits to the each of the plurality of pixel circuits, wherein:
the plurality of pixel circuits include a first pixel circuit and a second pixel circuit being disposed adjacent to the first pixel circuit in the arrangement order;
the plurality of gate signal lines include a first gate signal line being disposed between the first pixel circuit and the second pixel circuit and being connected to the first pixel circuit, and a second gate signal line being disposed adjacent to the first gate signal line in the arrangement order and being connected to the second pixel circuit;
the plurality of gate signals include a first gate signal output to the first gate signal line and a second gate signal output to the second gate signal line;
the gate signal output to each of the plurality of gate signal lines is controlled to the ON voltage in a period in which the data signal line driving circuit supplies, to the data signal line, a display control voltage corresponding to display data of a pixel circuit connected to the each of the plurality of gate signal lines, and in a predetermined period prior to the period;
each of the plurality of pixel circuits comprises a pixel electrode, a reference electrode to which the reference voltage corresponding to each of the plurality of pixel circuits is supplied, and a switching element which is provided between the data signal line and the pixel electrode and is controlled by the gate signal, wherein the pixel electrode and the reference electrode form a pixel capacitance;
the data signal line driving circuit is configured so that, in the forward scanning driving, the display control voltage in the pixel electrode of the second pixel circuit supplied from the data signal line is lowered by a first drop-off voltage due to a change of the second gate signal from the ON voltage to an OFF voltage in accordance with the first gate signal being at the OFF voltage;
the data signal line driving circuit is configured so that, in the backward scanning driving, the display control voltage in the pixel electrode of the second pixel circuit supplied from the data signal line is lowered by the first drop-off voltage due to a change of the second gate signal from the ON voltage to the OFF voltage under the first gate signal being at the ON voltage, and is further lowered by a second drop-off voltage due to change of the first gate signal from the ON voltage to the OFF voltage in accordance with the second gate signal being at the OFF voltage;

the reference voltage line driving circuit is configured to generate a reference voltage for forward direction to compensate a drop of the first drop-off voltage, to generate a reference voltage for reverse direction to compensate drops of both the first drop-off voltage and the second drop-off voltage, and to select and supply one of the reference voltage for forward direction and the reference voltage for reverse direction to the reference electrode of the each of the plurality of pixel circuits in accordance with whether the gate signal line driving circuit outputs the plurality of gate signals in the one of the forward direction and the reverse direction to the arrangement order.

2. The display device according to claim 1, wherein the reference voltage line driving circuit comprises:

a storage portion for storing voltage information for determining the reference voltage for forward direction and the reference voltage for reverse direction; and a generation circuit for generating the reference voltage corresponding to the each of the plurality of pixel circuits based on the voltage information.

3. The display device according to claim 2, wherein:

the reference voltage for forward direction and the reference voltage for reverse direction each comprise a direct voltage; and the voltage information comprises a value of the reference voltage for forward direction and a value of the reference voltage for reverse direction.

4. The display device according to claim 2, wherein:

the reference voltage for forward direction and the reference voltage for reverse direction each comprise a direct voltage; and the voltage information comprises one of a value of the reference voltage for forward direction and a value of the reference voltage for reverse direction, and a difference value between the reference voltage for forward direction and the reference voltage for reverse direction.

5. The display device according to claim 2, wherein:

the reference voltage for forward direction and the reference voltage for reverse direction each comprise a direct voltage; and the voltage information comprises an average value between the reference voltage for forward direction and the reference voltage for reverse direction, and a half value of a difference value between the reference voltage for forward direction and the reference voltage for reverse direction.

6. The display device according to claim 2, wherein:

the reference voltage for forward direction and the reference voltage for reverse direction each comprise an alternating voltage that repeats Low voltage and High voltage alternately at a predetermined cycle, the High voltage being higher than the Low voltage by a predetermined amplitude value; and the voltage information comprises a reference value of the reference voltage for forward direction, a reference value of the reference voltage for reverse direction, and the predetermined amplitude value.

7. The display device according to claim 6, wherein the reference values comprise any one of the Low voltage and the High voltage of the alternating voltage.

8. The display device according to claim 2, wherein:

the reference voltage for forward direction and the reference voltage for reverse direction each comprise an alternating voltage that repeats Low voltage and High voltage alternately at a predetermined cycle, the High voltage being higher than the Low voltage by a predetermined amplitude value; and the voltage information comprises any one of a reference value of the reference voltage for forward direction and a reference value of the reference voltage for reverse direction, a difference value between the reference value of the reference voltage for forward direction and the reference value of the reference voltage for reverse direction, and the predetermined amplitude value.

9. The display device according to claim 8, wherein the reference values comprise any one of the Low voltage and the High voltage of the alternating voltage.

10. The display device according to claim 2, wherein:

the reference voltage for forward direction and the reference voltage for reverse direction each comprise an alternating voltage that repeats Low voltage and High voltage alternately at a predetermined cycle, the High voltage being higher than the Low voltage by a predetermined amplitude value; and the voltage information comprises an average value between a center value of the reference voltage for forward direction and a center value of the reference voltage for reverse direction, a half value of a difference value between the center value of the reference voltage for forward direction and the center value of the reference voltage for reverse direction, and a half value of the predetermined amplitude value, the center value being an average value between the Low voltage and the High voltage of the alternating voltage.

11. The display device according to claim 2, wherein the voltage information comprises representative value information for determining any one of the reference voltage for forward direction and the reference voltage for reverse direction, and difference information for determining another one of the reference voltage for forward direction and the reference voltage for reverse direction by using the representative value information.

12. The display device according to claim 1, further comprising at least one reference voltage line connected to the reference voltage line driving circuit, wherein:

the reference electrode of the each of the plurality of pixel circuits is connected to one of the at least one reference voltage line; and the reference voltage line driving circuit supplies, to each of the at least one reference voltage line, a reference voltage corresponding to one of the plurality of pixel circuits.

13. The display device according to claim 1, wherein:

the display device comprises an IPS liquid crystal display device; and the each of the plurality of pixel circuits has a structure in which the reference electrode is formed further from the pixel electrode with respect to the plurality of gate signal lines.

14. A display device, comprising:

a data signal line;

a plurality of pixel circuits, which are connected to the data signal line and arranged in order;

a plurality of gate signal lines arranged in the arrangement order, each of which extends between adjacent ones of the plurality of pixel circuits and is connected to pixel circuits disposed on one side;

a gate signal line driving circuit for selecting any one of a forward direction and a reverse direction to the arrangement order as time passes, and outputting a plurality of gate signals that are controlled to an ON voltage sequentially in the selected direction, to the plurality of gate signal lines arranged in the arrangement order;

a data signal line driving circuit for selecting one of the plurality of pixel circuits and supplying a display control voltage corresponding to display data of the selected pixel circuit to the data signal line; and a reference voltage line driving circuit for supplying a reference voltage corresponding to each of the plurality of pixel circuits to the each of the plurality of pixel circuits, wherein:

the gate signal output to each of the plurality of gate signal lines is controlled to the ON voltage in a period in which the data signal line driving circuit supplies, to the data signal line, a display control voltage corresponding to display data of a pixel circuit connected to the each of the plurality of gate signal lines, and in a predetermined period prior to the period;

each of the plurality of pixel circuit comprises a pixel electrode, a reference electrode to which the reference voltage corresponding to the each of the plurality of pixel circuits is supplied, and a switching element which is provided between the data signal line and the pixel electrode and is controlled by the gate signal; and the reference voltage line driving circuit selects and supplies one of a reference voltage for forward direction and a reference voltage for reverse direction to the reference electrode of the each of the plurality of pixel circuits in accordance with whether the gate signal line driving circuit outputs the plurality of gate signals in the one of the forward direction and the reverse direction to the arrangement order, wherein the reference voltage line driving circuit comprises:

a storage portion for storing voltage information for determining the reference voltage for forward direction and the reference voltage for reverse direction; and a generation circuit for generating the reference voltage corresponding to the each of the plurality of pixel circuits based on the voltage information, wherein:

the reference voltage for forward direction and the reference voltage for reverse direction each comprise a direct voltage; and the voltage information comprises an average value between the reference voltage for forward direction and the reference voltage for reverse direction, and a half value of a difference value between the reference voltage for forward direction and the reference voltage for reverse direction.

15. A display device, comprising:

a data signal line;

a plurality of pixel circuits, which are connected to the data signal line and arranged in order;

a plurality of gate signal lines arranged in the arrangement order, each of which extends between adjacent ones of the plurality of pixel circuits and is connected to pixel circuits disposed on one side;

a gate signal line driving circuit for selecting any one of a forward direction and a reverse direction to the arrangement order as time passes, and outputting a plurality of gate signals that are controlled to an ON voltage sequentially in the selected direction, to the plurality of gate signal lines arranged in the arrangement order;

a data signal line driving circuit for selecting one of the plurality of pixel circuits and supplying a display control voltage corresponding to display data of the selected pixel circuit to the data signal line;

a reference voltage line driving circuit for supplying a reference voltage corresponding to each of the plurality of pixel circuits to the each of the plurality of pixel circuits, wherein:

the gate signal output to each of the plurality of gate signal lines is controlled to the ON voltage in a period in which the data signal line driving circuit supplies, to the data signal line, a display control voltage corresponding to display data of a pixel circuit connected to the each of the plurality of gate signal lines, and in a predetermined period prior to the period;

each of the plurality of pixel circuit comprises a pixel electrode, a reference electrode to which the reference voltage corresponding to the each of the plurality of pixel circuits is supplied, and a switching element which is provided between the data signal line and the pixel electrode and is controlled by the gate signal; and the reference voltage line driving circuit selects and supplies one of a reference voltage for forward direction and a reference voltage for reverse direction to the reference electrode of the each of the plurality of pixel circuits in accordance with whether the gate signal line driving circuit outputs the plurality of gate signals in the one of the forward direction and the reverse direction to the arrangement order, wherein the reference voltage line driving circuit comprises:

a storage portion for storing voltage information for determining the reference voltage for forward direction and the reference voltage for reverse direction; and a generation circuit for generating the reference voltage corresponding to the each of the plurality of pixel circuits based on the voltage information, wherein:

the reference voltage for forward direction and the reference voltage for reverse direction each comprise an alternating voltage that repeats Low voltage and High voltage alternately at a predetermined cycle, the High voltage being higher than the Low voltage by a predetermined amplitude value; and the voltage information comprises an average value between a center value of the reference voltage for forward direction and a center value of the reference voltage for reverse direction, a half value of a difference value between the center value of the reference voltage for forward direction and the center value of the reference voltage for reverse direction, and a half value of the predetermined amplitude value, the center value being an average value between the Low voltage and the High voltage of the alternating voltage.

* * * * *